(12) United States Patent
Rabnawaz et al.

(10) Patent No.: US 11,529,648 B2
(45) Date of Patent: *Dec. 20, 2022

(54) SELF-HEALING LAMINATE COMPOSITION, RELATED ARTICLES AND RELATED METHODS

(71) Applicant: BOARD OF TRUSTEES OF MICHIGAN STATE UNIVERSITY, East Lansing, MI (US)

(72) Inventors: Muhammad Rabnawaz, East Lansing, MI (US); Ajmir Khan, Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/419,781

(22) PCT Filed: Jan. 29, 2020

(86) PCT No.: PCT/US2020/015581
§ 371 (c)(1),
(2) Date: Jun. 30, 2021

(87) PCT Pub. No.: WO2020/160089
PCT Pub. Date: Aug. 6, 2020

(65) Prior Publication Data
US 2022/0040730 A1 Feb. 10, 2022

Related U.S. Application Data

(60) Provisional application No. 62/799,618, filed on Jan. 31, 2019.

(51) Int. Cl.
*B05D 7/00* (2006.01)
*C09D 175/12* (2006.01)
(Continued)

(52) U.S. Cl.
CPC ............. *B05D 7/546* (2013.01); *B05D 5/005* (2013.01); *C09D 131/04* (2013.01);
(Continued)

(58) Field of Classification Search
None
See application file for complete search history.

(56) References Cited

U.S. PATENT DOCUMENTS 4,683,171 A   7/1987   Kuga et al.
5,688,598 A * 11/1997   Keck ..................... H01B 3/421
                                                         525/445

(Continued)

FOREIGN PATENT DOCUMENTS

FR         2175130 A   * 10/1973
GB         1184539 A   *  3/1970
WO   WO-2019/099608 A1    5/2019

OTHER PUBLICATIONS

Naveed et al., Dual-layer approach toward self-healing and self-cleaning polyurethane thermosets, Polymers, 11(11):1-12 (2019).
(Continued)

*Primary Examiner* — Tae H Yoon
(74) *Attorney, Agent, or Firm* — Marshall, Gerstein & Borun LLP

(57) ABSTRACT

The disclosure relates to a self-healing laminate composition. The composition includes a first, self-healing layer with a self-healing polymer and a second, mechanical layer adjacent to the first layer. The second layer includes any desired polymer, for example a crosslinked polymer, a thermoplastic polymer, or a functional thermoset polymer. Self-healing polymers with dynamic covalent bonds are suitable, for example those with dynamic urea bonds and/or dynamic urethane bonds. A self-healing polymer that is damaged can undergo autonomous repair when separated surfaces re-contact each other due to the soft nature of the
(Continued)

self-healing polymer, whereupon reversible bonds can reform to rejoin and repair the damaged self-healing polymer. When the self-healing laminate according to the disclosure is damaged, the self-healing mechanism of the first layer can cause the repair of both layers. The self-healing laminate composition can be used as a coating on any of a variety of substrates to provide self-healing properties to a surface of the substrate.

36 Claims, 5 Drawing Sheets

(51) Int. Cl.
    *C09D 167/04*    (2006.01)
    *C09D 167/02*    (2006.01)
    *C09D 131/04*    (2006.01)
    *C09D 183/04*    (2006.01)
    *B05D 5/00*    (2006.01)

(52) U.S. Cl.
    CPC ......... *C09D 167/02* (2013.01); *C09D 167/04* (2013.01); *C09D 175/12* (2013.01); *C09D 183/04* (2013.01)

(56) References Cited

U.S. PATENT DOCUMENTS

| | | | |
|---|---|---|---|
| 7,153,568 | B2 | 12/2006 | Suzuki et al. |
| 8,664,298 | B1 | 3/2014 | Ou et al. |
| 8,987,352 | B1 | 3/2015 | Ou et al. |
| 11,053,337 | B2 * | 7/2021 | Rabnawaz ............ C08G 18/61 |
| 11,135,617 | B2 * | 10/2021 | Rabnawaz ........... C09D 175/08 |
| 2004/0087759 | A1 | 5/2004 | Malik et al. |
| 2006/0035091 | A1 | 2/2006 | Bruchmann et al. |
| 2016/0032054 | A1 | 2/2016 | Cheng et al. |
| 2016/0200937 | A1 | 7/2016 | Hu et al. |
| 2017/0198154 | A1 | 7/2017 | Gesford et al. |
| 2018/0009933 | A1 | 1/2018 | Cheng et al. |
| 2018/0030269 | A1 | 2/2018 | Kim et al. |
| 2018/0079850 | A1 | 3/2018 | Tonelli et al. |
| 2018/0223127 | A1 * | 8/2018 | Cho ........................ C08L 71/02 |

OTHER PUBLICATIONS

Cao et al., A thermal self-healing polyurethane thermoset based on phenolic urethane, Polymer J., (2017):1-7 (2017).
NEI Corporation, White Paper: A New Approach To Using Self-healing Coatings, available from https://neicorporation.com/white-papers/NANOMYTE_MEND-RT_Technical_Brief.pdf (last accessed Jun. 29, 2021) (2015).
International Application No. PCT/US20/15581, International Search Report and Written Opinion, dated Jun. 17, 2020.

* cited by examiner

SELF-HEALING LAMINATE COMPOSITION, RELATED ARTICLES AND RELATED METHODS

CROSS-REFERENCE TO RELATED APPLICATIONS

This is a National Stage of International Application No. PCT/US20/15581, filed Jan. 29, 2020 (incorporated herein by reference in its entirety), which claims priority to U.S. Provisional Application No. 62/799,618 (filed Jan. 31, 2019), which is incorporated herein by reference in its entirety.

STATEMENT OF GOVERNMENT INTEREST

None.

BACKGROUND OF THE DISCLOSURE

Field of the Disclosure

The disclosure relates to a self-healing laminate composition. The composition includes a first, self-healing layer with a self-healing polymer and a second, mechanical layer adjacent to the first layer. A self-healing polymer that is damaged can undergo autonomous repair when separated surfaces re-contact each other due to the soft nature of the self-healing polymer, whereupon reversible bonds can reform to rejoin and repair the damaged self-healing polymer. When the self-healing laminate according to the disclosure is damaged, the self-healing mechanism of the first layer can cause the repair of both layers. The self-healing laminate composition can be used as a coating on any of a variety of substrates to provide self-healing properties to a surface of the substrate.

Brief Description of Related Technology

Structural and functional materials are susceptible to damage during their use that can lead to accelerated degradations at the damaged section, malfunctions of the material as well as exposing the surface to environmental degradation. If this damage is not repaired in the earlier stages, a substrate underlying a damaged coating/material becomes vulnerable to various types of deterioration (rusting, decolorization, mechanical degradations, etc.). Also, cracks grow and readily spread to nearby areas. While frequent repairs are necessary to avoid the damage arising from the cracks, however, these repairs have several challenges including high maintenance cost and the environmental hazards associated with the disposal of the used material. Also, minor scratches are difficult to spot until the damage spreads and becomes more severe.

Self-healing materials offer effective solutions to the above challenges. Tiny cracks and minor damage can undergo self-healing without the need for additional materials to cover the damage. More importantly, minor scratches which are difficult to detect can be healed before the crack grows further. Due to this pivotal role, self-healing materials are also called as the next generation materials, which will find a wide range of applications associated with structural and functional materials.

Self-healing coatings heal or repair by themselves with or without the application of heat/radiation, thus saving repair costs. Consequently, these materials are highly attractive for industries. Two common approaches rely on intrinsic and extrinsic self-healing materials. Intrinsic self-healing operates through dynamic reversible bonding, while extrinsic self-healing relies on the use of a pre-embedded healing agent that fills the crack by undergoing a reaction. Intrinsic self-healing approach has been widely investigated using a variety of dynamically reversible bonds such as disulfide-bonds, acylhydrazone bonds, nitroxides, and those formed via Diels-Alder addition or trans-esterification reactions. Non-covalent reversible interactions such as hydrogen bonding, high-valence metal chelation, and host-guest interactions have also been used to enable self-healing. One of the key advantages of this approach includes the capability of exhibiting repeated healing cycles at the same location due to inexhaustible reversible bonding. However, intrinsic healing materials have critical disadvantages such as the need for chemical modification of the materials and the need for external stimuli such as light or thermal treatment to trigger self-healing. Intrinsic self-healing materials can exhibit healing at ambient temperature, but these materials generally have poor mechanical properties. For example, coatings that are healed at ambient or near ambient temperature are very soft and typically have a modulus of less than 1 MPa. When mechanical properties of the films/materials are increased, it diminishes the ambient healing feature, thus requiring costly and tedious thermal treatments.

An advantage of the extrinsic approach is the self-healing of the damaged section without the need for external stimuli. However, without addressing certain limitations, extrinsic approaches will have very limited real-world applications. These limitations include: 1) the chemicals used as healing agents require long-term stability; 2) lack of repeated healing due to the consumption of microcapsules; 3) poor optical clarity of the end film/coating due to light scattering by the microcapsules; 4) deactivation and leakage of the capsules prior to crack development; and 5) lack of sufficient encapsulants to fill large cracks.

As discussed above, at present, both intrinsic and extrinsic approaches have their own limitations, which have hindered their real-world applications. Although this research has been ongoing for decades, these limitations remain unaddressed. Some key limitations associated with the intrinsic approach include their non-autonomous self-healing nature and poor mechanical properties. Meanwhile, the extrinsic approach is plagued by the one-time healing, instability/leakage of the encapsulants and poor optical clarity of the final materials. Thus, there is a need for a new approach that offers autonomous self-healing, materials that can be repeatedly repaired, and materials that also offers excellent mechanical properties over a wide-range of working temperatures.

SUMMARY

In one aspect, the disclosure relates to a self-healing laminate composition comprising: a first (self-healing) layer comprising a self-healing polymer; and a second (mechanical) layer adjacent to the first layer and comprising a polymer selected from the group consisting of a crosslinked (e.g., thermoset) polymer, a thermoplastic polymer, a functional thermoset polymer (e.g., omniphobic thermoset, etc.), and combinations thereof. The second layer can include polymer blends and/or multiple sub-layers of one or more generally non-self-healing polymers, although the second layer can include some self-healing functionality. The first layer is generally a bottom or lower layer, not being exposed to the external environment during use. The first layer can be attached/bound/applied to a substrate in a corresponding article, or the first layer can be closer to the substrate than the second layer in the article, for example when there are one or more other intervening layers between the substrate and first layer (e.g., adhesion layers or other layers). Conversely, the second layer is generally a top or upper layer, being exposed to the external environment during use. The second layer is generally not attached/bound/applied to a substrate in a corresponding article, or the second layer can be farther from the substrate than the first layer in the article.

Various refinements of the disclosed self-healing laminate composition are possible.

In a refinement, the self-healing polymer comprises backbone segments comprising reversible linking groups (e.g., reversible bond reaction products) selected from the group consisting of non-covalent interactions (e.g., hydrogen bonding, high-valence metal chelation, host-guest interactions), coatings with trapped unreacted reagents, dynamic covalent bonds (e.g., disulfide-bonds, acylhydrazone bonds, nitroxides, bonds formed via Diels-Alder addition or transesterification reactions, dynamic urea bonds, dynamic urethane bonds), thermoreversible bonds, mechanically reversible bonds, UV-triggerable reversible bonds, and combinations thereof.

In a refinement, the self-healing polymer comprises dynamic urea bonds and/or dynamic urethane bonds. For example, the self-healing polymer can comprise: (i) first backbone segments having a structure corresponding to at least one of a urethane reaction product and a urea reaction product from at least one polyisocyanate; (ii) second backbone segments having a structure corresponding to at least one of a urethane reaction product and a urea reaction product from at least one reversible polyfunctional linker (e.g., di-, tri-, or higher functionality linker or crosslinker) comprising at least one of a hindered secondary amino group and an aromatic hydroxy group (e.g., two, three, or more total amino/hydroxy groups for reaction with the polyisocyanate, at least one of the amino/hydroxy groups is the hindered secondary amino group or aromatic hydroxy group for reversible bond formation); and (iii) first linking groups reversibly linking the first backbone segments and the second backbone segments (e.g., as dynamic/reversible urea and/or urethane bonds), the first linking groups comprising at least one of (A) a reversible urea reaction product between the polyisocyanate and the hindered secondary amino group of the reversible polyfunctional linker and (B) a reversible urethane reaction product between the polyisocyanate and the aromatic hydroxy group of the reversible polyfunctional linker. Suitably, if the overall functionality of the polyfunctional linker is more than three, at least two of the functional groups are reversible functional groups in order to avoid an extensively crosslinked structure without sufficient reversible bonding capability for self-healing. Likewise, the number of non-hindered amino groups and non-aromatic hydroxy groups suitably is 2, 1, or 0 avoid potential formation of a non-reversible structure.

The reversible urea reaction product generally corresponds to a urea reaction product in dynamic equilibrium between the isocyanate groups of the polyisocyanate forming the first backbone segments and the hindered secondary amino group of the reversible polyfunctional linker of the second backbone segments. The equilibrium is substantially shifted to the urea reaction product (e.g., at least 50%, 60%, 70%, 80%, 90% and/or up to 80%, 90%, 95%, 98%, 99, or 99.99% of isocyanate and 2° amino groups are in urea form), but at least some of the isocyanate and 2° amino groups are unreacted (e.g., at least 1%, 2%, 5%, 10%, or 20% and/or up to 20%, 30%, 40%, or 50% of isocyanate and 2° amino groups are unreacted), which unreacted groups exist due to the equilibrium between dynamic urea bond. The equilibrium is dynamic as a result of steric hindrance from the secondary amino group, resulting in a continuous breaking and reforming of the urea bonds between different isocyanate and 2° amino groups, even at normal use temperatures. Self-healing can be accelerated by heating a damaged laminate composition because it accelerates the equilibrium reaction (although it need not necessarily shift the equilibrium toward more or fewer urea groups) and softens the composition without melting or destroying it. A softened composition promotes polymer chains contact at a damaged interface between different regions of the composition, whereupon the dynamic urea bonds can re-form at the damaged interface to rejoin the separated portions of the composition.

The reversible urethane reaction product generally corresponds to a urethane reaction product between the isocyanate groups of the polyisocyanate forming the first backbone segments and the aromatic hydroxy group of the reversible polyfunctional linker of the second backbone segments. In contrast to the reversible urea bond, the reversible urethane bond need not be in equilibrium, dynamic or otherwise (e.g., substantially all of the isocyanate and aromatic hydroxy groups are in urethane form). The bond is reversible in that the application of heat to the composition can break the reversible urethane bond to re-form the isocyanate and aromatic hydroxy groups because of the ability of the aromatic group to which the hydroxy group is attached to delocalize and stabilize a negative charge when the urethane bond first breaks. Heating can also bring about an equilibrium state between the urethane, isocyanate, and aromatic hydroxy groups at the higher temperatures, but which equilibrium state did not exist at normal use temperatures. Self-healing can be thus effected by heating a damaged laminate composition because it breaks at least some urethane groups and softens the composition without melting or destroying it. A softened composition promotes contact at a damaged interface between different regions of the composition, whereupon the reversible urethane bonds can re-form at the damaged interface to rejoin the separated portions of the composition, which urethane bonds remain and continue to form as it cools.

In a particular refinement including dynamic urea and/or urethane bonds, the reversible polyfunctional linker comprises at least two hindered secondary amino groups. The hindered secondary amino group can generally have a structure of $R_1(NH)R_2G$. $R_1$ can generally include any sterically hindering group, for example a hydrocarbon or other group having from 1 to 18 carbon atoms (e.g., at least 1, 2, 3, 4 and/or up to 4, 6, 8, 10, 12, or 18 carbon atoms). For example, $R_1$ can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring). Specific examples for $R_1$ include $C_1$-$C_4$ alkyl, such as isopropyl, sec-butyl, and tert-butyl. Other examples for $R_1$ include aryl, $(C_1$-$C_{20})$alkyl, $(C_1$-$C_{20})$cycloalkyl, $(C_1$-$C_{20})$alkyl$(C_4$-$C_{10})$cycloalkyl, $(C_1$-$C_{20})$alkyl$(C_4$-$C_{10})$cycloalkyl $(C_{1\text{-}20})$alkyl, and $(0_{2\text{-}20})$alkyl-PEG-$(C_{2\text{-}20})$alkyl, with or without an intervening linking carbon between the foregoing groups and the —NH— group. The group —NH— corresponds to the secondary nitrogen atom/amino group. $R_2$ can generally include any linking group to at least one other amino or hydroxy group(s) G that is capable of reacting with the polyisocyanate to form a corresponding urea or urethane group, respectively, which urea or urethane group can be a reversible or irreversible. $R_2$ likewise can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms). Specific examples for $R_2$ include $C_1$-$C_4$ alkylene, such as methylene, ethylene, propylene, and butylene. Other examples for $R_2$ include $(C_1$-$C_{100})$alkyl, $(C_1$-$C_{20})$alkyl, $(C_4$-$C_{10})$cyclolalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, $(C_1$-$C_{20})$alkylO$(C_1$-$C_{20})$alkyl, $(C_1$-$C_{20})$alkylS$(C_1$-$C_{20})$alkyl, —N$(R_1)$—, =N—, —C$(X)_2$— (X is halo), —NC(=O)$(C_1$-$C_{20})$alkyl, —C(=O)$(C_1$-$C_{20})$alkyl-, —C(=O)—$(NR_1)$—, —S(=O)$_2$O—, —S(=O)$_2$—$(C_1$-$C_{20})$alkyl-, —OS(=O)$_2$O$(C_1$-$C_{20})$alkyl-, —S(=O)$_2$$NR_1$—, —S(=O)$(C_1$-$C_{20})$alkyl-, —P(=O)$(OR_1)$O—, —C(S)—$(C_1$-$C_{20})$alkyl-, —C(=O)O$(C_1$-$C_{20})$alkyl-, —C(=O)O—, —C(=S)O$(C_1$-$C_{20})$alkyl-, —C(=O)S$(C_1$-$C_{20})$alkyl-, —C(=S)S$(C_1$-$C_{20})$alkyl-, —C(=O)$NR_1$—$(C_1$-$C_{20})$alkyl-, and —C(=$NR_1$)$NR_1$—. In the case where the reversible polyfunctional linker has two (e.g., only two) hindered secondary amino groups, the structure can be represented by $R_1$(NH)$R_2$(NH)$R_3$, where $R_3$ is any sterically hindering group analogous to $R_1$, for example according to any of the above definitions for $R_1$, where $R_1$ and $R_3$ can be the same or different. In some embodiments, secondary amines can be part of separate or the same ring structures. For example, when having one or more secondary amines, a ring size can have of 3 to 16 carbons atoms. In terms of the above structures, a formula of $R_1$(NH)$R_2$G can represent a cyclic secondary amine when $R_1$ and $R_2$ together form a ring, such as a $(C_1$-$C_{20})$alkyl$(C_4$-$C_{10})$cycloalkyl in 2,2,6,6-tetramethyl-4-piperidinol. Likewise, a formula of $R_1$(NH)$R_2$(NH)$R_3$ can represent a bicyclic secondary amine when $R_1$ and $R_2$ together form a first ring and when $R_2$ and $R_3$ together form a second ring.

In a particular refinement including dynamic urea and/or urethane bonds, the reversible polyfunctional linker has one hindered secondary amino group (e.g., contains only one hindered secondary amino group). This can be represented by the general structure $R_1$(NH)$R_2$(NH$_2$) or $R_1$(NH)$R_2$(OH), where $R_1$ and $R_2$ can be as described above.

In a particular refinement including dynamic urea and/or urethane bonds, the reversible polyfunctional linker is selected from the group consisting of N,N'-di(t-butyl) ethylenediamine, N,N'-di(iso-propyl) ethylenediamine, N,N'-di(iso-butyl) ethylenediamine and combinations thereof. Additionally, hindered amine compounds carrying reactive groups such as hydroxyl can be used for reversible urea-urethane systems (e.g., 2,2,6,6-Tetramethyl-4-piperidinol).

In a particular refinement including dynamic urea and/or urethane bonds, the reversible polyfunctional linker comprises at least two aromatic hydroxy groups. The aromatic hydroxy group includes a hydroxy (OH) group bound directly to an aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring), for example including a phenolic group or hydroxyphenyl group. The aromatic hydroxy group can include multiple hydroxy groups bound to the same aromatic or heteroaromatic group (e.g., as in the case of a gallic acid derivative), for example where the polyfunctional linker has only one aromatic or heteroaromatic group but multiple hydroxy groups attached thereto for at least two aromatic hydroxy groups. In some other embodiments, the aromatic hydroxy group can include two or more aromatic or heteroaromatic groups linked together, each with one or more hydroxy groups attached thereto (e.g., such as for a bisphenol compound having two hydroxyphenyl groups).

In a particular refinement including dynamic urea and/or urethane bonds, the reversible polyfunctional linker has one aromatic hydroxy group (e.g., contains only one aromatic hydroxy group). This can be represented by the general structure (HO)A$R_2$(NH$_2$) or (HO)A$R_2$(OH), where A is an aromatic or heteroaromatic group as described above and $R_2$ can be as described above for the hindered amine.

In a particular refinement including dynamic urea and/or urethane bonds, the reversible polyfunctional linker is selected from the group consisting of gallic acid esters (e.g., propyl gallate), benzene diols (e.g., 1,4-benzenediol, 1,3-benzenediol, 1,2-benzenediol), halo-substituted benzene diols (e.g., 2-chloro-1,4-benzenediol), alkyl-substituted benzene diols (e.g., 2-methyl-1,4-benzenediol), bisphenols (e.g., bisphenol A, bisphenol F), ubiquiniol, genistein, gallic acid, pyrogailol, aloe emodin, poly(caffeic acid methyl ester), and combinations thereof. In certain cases, one or more hydroxy groups can be attached to a non-aromatic carbon and one or more hydroxy groups can be attached to an aromatic ring such as in polytyrosol. Natural polymers such as lignin that has aromatic and aliphatic hydroxy groups can be used as reversible polyfunctional linker for a self-healing urethane. In such cases, the aliphatic hydroxy groups of the lignin suitably will be first protected (e.g., acetylated), thus leaving only aromatic hydroxy groups for reversible urethane bond formation.

In a particular refinement including dynamic urea and/or urethane bonds, the polyisocyanate comprises a diisocyanate. Suitably, the polyisocyanate for the first backbone segments of the self-healing polymer is a diisocyanate. This can desirably limit or prevent crosslinking in the self-healing polymer, which can be desirable to provide a self-healing polymer that is generally soft or flexible to promote re-contact and self-healing of damaged and separated areas, in particular at ambient temperatures. When the polyisocyanate includes three or more isocyanate groups, the functionality of the polyfunctional linker should be selected with a sufficient number of complementary reacting aromatic hydroxy or hindered secondary amino groups for reversible bonding with the isocyanate groups to retain self-healing properties.

In a particular refinement including dynamic urea and/or urethane bonds, the polyisocyanate comprises a polyurethane prepolymer diisocyanate. The polyurethane prepolymer diisocyanate can be a (linear) polyurethane prepolymer with two terminal isocyanate groups at opposing ends. The polyurethane prepolymer can be suitable for promoting compatibility with the second layer (e.g., mechanical layer), for example when the second layer is itself a polyurethane polymer or otherwise includes urethane groups. The polyurethane prepolymer suitably includes polyether backbone segments (e.g., polytetrahydrofuran segments, ethylene oxide segments) to provide flexibility to the self-healing polymer. The polyurethane prepolymer diisocyanate can be a reaction product between a polyether diol of the general formula HO$((CH_2)_m O)_n$H, where n can be from 2 to 20, 4 to 16, or 6 to 12 and m can be 2 to 8, 2 to 4, or 2, and a diisocyanate (e.g., hexane 1,6-diisocyanate (HDI) or others as noted below) in sufficient amount to react with both diol hydroxy groups, thus providing two terminal isocyanate groups and two urethane groups per prepolymer unit. The polyisocyanate prepolymers can include those with a sub-ambient glass transition temperature ($T_g$) or with an above-ambient $T_g$. Polyisocyanate prepolymers with sub-ambient $T_g$ values are suitable for laminate compositions that are intended to be self-healing at ambient temperature conditions (e.g., 0-40° C. or 10-30° C.). Polyisocyanate prepolymers with above-ambient $T_g$ values are suitable for laminate compositions that are intended to be self-healing at higher temperature conditions (e.g., 30-150° C. or 40-120° C.), for example as a result of higher normal use temperatures of the composition or for compositions intended to have an external applied thermal treatment/heating for self-healing. The polyisocyanate prepolymers suitably have an Mw ranging from about 500-10000 g/mol.

In a particular refinement including dynamic urea and/or urethane bonds, the polyisocyanate comprises a triisocyanate. In some embodiments, the polyisocyanate for the first backbone segments of the self-healing polymer includes a triisocyanate, for example in combination with a diisocyanate. The inclusion of a tri- or higher functionality polyisocyanate can introduce some crosslinking into the self-healing polymer, for example to improve the mechanical strength of the first layer. Suitably, such crosslinking is a relatively low level to retain a generally flexible character of the self-healing polymer. When the polyisocyanate includes three or more isocyanate groups, the functionality of the polyfunctional linker should be selected with a sufficient number of complementary reacting aromatic hydroxy or hindered secondary amino groups for reversible bonding with the isocyanate groups to retain self-healing properties.

In a particular refinement including dynamic urea and/or urethane bonds, the polyisocyanate comprises (i) a diisocyanate and (ii) a tri- or higher isocyanate; and the tri- or higher isocyanate is present in an amount from 0.01 to 20 mol. % (e.g., at least 0.01, 0.1, 0.2, 0.5, or 1 mol. % and/or up to 1, 2, 3, 5, 7, 10, 15, or 20 mol. %) relative to total polyisocyanates in the self-healing polymer. The relative isocyanate content of the tri- or higher isocyanates relative to total polyisocyanates can reflect the relative amounts of polyisocyanate monomers/oligomers/prepolymers etc. used to form the self-healing polymer and/or the relative amounts of the different first backbone segments corresponding to the different polyisocyanates in the self-healing polymer.

In a particular refinement including dynamic urea and/or urethane bonds, the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In a refinement, the self-healing polymer has a glass transition temperature ($T_g$) of 45° C. or less. The self-healing polymer is suitably soft, for example having a $T_g$ below ambient use temperatures and is a non-crystalline or have very little crystallinity. This facilitates physical contact between otherwise separate polymer chains at a damage site in self-healing polymer. Suitably, the glass transition temperature ($T_g$) is at least −100, −50, −20, 0, 20, or 30° C. and/or up to −20, 0, 10, 15, 20, 30, 45, 50, 80, 100, or 150° C. A $T_g$ of 45° C. or less is particularly suitably for ambient self-healing, considering that ambient use temperatures can be as high as about 50° C. in some applications, in which the polymer can self-heal with ease. For non-ambient healing, the $T_g$ can be higher, such as at least or up to 30, 50, 80, or 150° C.

In a refinement, the first (self-healing) layer further comprises one or more additives selected from the group consisting of nanoclay, graphene oxide, graphene, graphite (e.g., ground graphite), silicon dioxide (silica), aluminum oxide, cellulose nanocrystals, carbon nanotubes, zirconia, titanium dioxide (titania), diatomaceous earth, biocides, pigments, dyes, thermoplastics, low and high molecular weight poly (ethylene oxide), salts (e.g., tetra alkyl ammonium), non-ionic ingredients (e.g., non-surfactants such as TWEEN or polysorbate 80, TWEEN or polysorbate 85), polyhedral oligomeric silsesquioxane (POSS) and POSS derivatives, functional agents (e.g., antistatic agents, UV blockers) and combinations thereof. The additives can be nano-scale (nanofillers) or micro-scale (microfillers). The additives can be included in the first (self-healing) layer in a range from 0.01 to 50 wt. %, for example at least 0.01, 0.1, 0.2, 0.5, 1, 2, 5, or 10 wt. % and/or up to 1, 2, 5, 10, 15, 20, 35, or 50 wt. %. The additives can improve thermal conductivity of the corresponding layer to promote heat transfer, for example when including graphene oxide, (ground) graphite, etc. The additives can improve the mechanical properties of the corresponding layer, such as wear-resistance, for example for coatings including nanoclay, zirconia, silica, titania, etc.

In a refinement, the second layer comprises the crosslinked polymer (e.g., thermoset polyurethane, thermoset epoxy, a hybrid thermoset such as siloxane-urethane).

In a refinement, the second layer comprises the thermoplastic polymer (e.g., poly(ethylene terephthalate) (PET), polylactide (PLA), poly(vinyl acetate) (PVAc), polypropylene (PP), etc.).

In a refinement, the second layer (e.g., mechanical layer) comprises the functional thermoset polymer (e.g., omniphobic epoxy, omniphobic urethane, anti-rust top organic, inorganic or hybrid thermosets, anti-ice thermoset, anti-smudge thermoset, anti-microbial thermoset, such as general thermoset polymers with one or more of functional additives incorporated therein).

In a refinement, the polymer of the second layer includes some self-healing functionality. This can result when the second layer polymer is any of a crosslinked polymer, a thermoplastic polymer, or a functional thermoset polymer, in particular when it is the crosslinked polymer or the functional thermoset polymer (e.g., a functional crosslinked polymer). For example, the polymer of the second layer can comprise (A) at least one of the crosslinked polymer and the functional thermoset polymer, and (B) a crosslinked backbone comprising: (i) first crosslinked backbone segments having a structure corresponding to at least one of a urethane reaction product and a urea reaction product from at least one second polyisocyanate; (ii) second crosslinked backbone segments having a structure corresponding to a urethane reaction product from at least one second polyol; (iii) optionally third crosslinked backbone segments having a structure corresponding to at least one of a urethane reaction product and a urea reaction product from at least one second reversible polyfunctional linker (e.g., di-, tri-, or higher functionality linker or crosslinker) comprising at least one of a hindered secondary amino group and an aromatic hydroxy group (e.g., two, three, or more total amino/hydroxy groups for reaction with the polyisocyanate, at least one of the amino/hydroxy groups is the hindered secondary amino group or aromatic hydroxy group for reversible bond formation); (iv) first linking groups linking (e.g., irreversibly linking) the first crosslinked backbone segments and the second crosslinked backbone segments, the first linking groups corresponding to a urethane reaction product of the second polyisocyanate and the second polyol; and (v) optionally second linking groups reversibly linking the first crosslinked backbone segments and the third crosslinked backbone segments (e.g., as dynamic/reversible urea and/or urethane bonds, when the third crosslinked backbone segments are present), the second linking groups comprising at least one of (A) a reversible urea reaction product between the second polyisocyanate and the hindered secondary amino group of the reversible polyfunctional linker and (B) a reversible urethane reaction product between the second polyisocyanate and the aromatic hydroxy group of the reversible polyfunctional linker. The terms "second" polyisocyanate, "second" polyol, and "second" reversible polyfunctional linker refer to the presence of the components in the second layer of the laminate composition. The components of the first layer above likewise can be referenced as the "first" polyisocyanate and "first" reversible polyfunctional linker. The "second" polyol does not imply or require more than one type of polyol to be present. Of course, more than one type of polyol can be used, for example a mixture of two of more polyols used to form the second crosslinked backbone segments in the second layer.

In a particular refinement including some self-healing functionality in the second layer, the second polyisocyanate comprises a tri- or higher isocyanate. The second polyisocyanate generally can include any of the polyisocyanates listed above for the first self-healing layer. The polyisocyanates in the two layers can be the same or different. Suitably, the second polyisocyanate is a tri- or higher isocyanate to promote (dense) crosslinking and mechanical strength for the second layer. In other cases, the second polyisocyanate can be a diisocyanate, for example when the second polyol has tri- or higher hydroxy functionality to promote crosslinking.

In a particular refinement including some self-healing functionality in the second layer, the second polyol comprises a diol In a particular refinement including some self-healing functionality in the second layer, the second polyol comprises a triol or higher polyol. As noted above, the second polyol can be a triol or higher polyol to promote crosslinking, regardless of whether the second polyisocyanate is difunctional.

In a particular refinement including some self-healing functionality in the second layer, the second polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, polyester polyols, polyurethane polyols, and combinations thereof. The second polyol additionally can be a biobased polyol.

In a particular refinement including some self-healing functionality in the second layer, the third crosslinked backbone segments and the second linking groups are present in the crosslinked polymer. For example, the second reversible polyfunctional linker can comprise the hindered secondary amino group or the aromatic hydroxy group. The second reversible polyfunctional linker generally can include any of the reversible polyfunctional linkers listed above for the first self-healing layer. The reversible polyfunctional linkers in the two layers can be the same or different. Alternatively or additionally, the second reversible polyfunctional linker is present in an amount from 0.1 to 20 mol. % (e.g., at least 0.1, 0.2, 0.5, 1, or 2 mol. % and/or up to 2, 3, 5, 7, 10, 15, or 20 mol. %) reversible reactive groups (e.g., hindered secondary amino group and/or aromatic hydroxy group) relative to total isocyanate groups in the crosslinked polymer. The relative reactive groups content of the second reversible polyfunctional linker relative to total isocyanate groups can reflect the relative amounts of second reversible polyfunctional linkers and second polyisocyanates used to form the crosslinked polymer and/or the relative amounts of the third crosslinked backbone segments to the first crosslinked backbone segments in the crosslinked polymer. Alternatively or additionally, the ratio of isocyanate:hydroxy:reversible group (e.g., NCO:polyol OH:2° amino or aromatic hydroxy) can range from 1:0.999:0.001 to 1:0.8:0.2, 1:0.99:0.01 to 1:0.9:0.1, or 1:0.98:0.02 to 1:0.95:0.05.

In a refinement, the second layer is directly adjacent to the first layer. The first and second layers can be in direct contact (e.g., bound, adhered) with each other. In some cases, the first and second layers can be indirectly adjacent to each other, for example when one or more intervening layers are present between the first and second layers. Such intervening layers could be a tie layer or other polymeric or adhesive layer to promote compatibility/adhesion between the first and second layers, for example when they are not particularly compatible. For example with a urethane or urea-urethane healable first (bottom) layer and a polypropylene second (top) layer, a poly(ethylene vinyl alcohol) polymer can be a suitable tie layer.

In a refinement, the second (mechanical) layer further comprises one or more additives selected from the group consisting of nanoclay, graphene oxide, graphene, graphite (e.g., ground graphite), silicon dioxide (silica), aluminum oxide, cellulose nanocrystals, carbon nanotubes, zirconia, titanium dioxide (titania), diatomaceous earth, biocides, pigments, dyes, thermoplastics, low and high molecular weight poly(ethylene oxide), salts (e.g., tetra alkyl ammonium), non-ionic ingredients (e.g., non-surfactants such as TWEEN or polysorbate 80, TWEEN or polysorbate 85), low-$T_g$ omniphobic polymers (e.g., PDMS, KRYTOX), polyhedral oligomeric silsesquioxane (POSS) and POSS derivatives, functional agents (e.g., antistatic agents, UV blockers) and combinations thereof. The additives can be nano-scale (nanofillers) or micro-scale (microfillers). The additives can be included in the second (mechanical) layer in a range from 0.01 to 50 wt. %, for example at least 0.01, 0.1, 0.5, 1, 2, 5, 7, or 10 wt. % and/or up to 5, 10, 15, 20, 30, or 50 wt. %. The additives can improve thermal conductivity of the corresponding layer to promote heat transfer, for example when including graphene oxide, (ground) graphite, etc. The additives can improve the mechanical properties of the corresponding layer, such as wear-resistance, for example for coatings including nanoclay, zirconia, silica, titania, etc.

In a refinement, the second (mechanical) layer further comprises one or more low $T_g$ (e.g., −150° C. to +50° C.) omniphobic polymers as an additive, for example including functionalized polysiloxanes, functionalized polyperfluoroethers, functionalized polybutadienes, functionalized polyisobutenes, functionalized branched polyolefins, functionalized poly(meth)acrylates, and combinations thereof.

In a refinement, the first (self-healing) layer has a thickness ranging from 0.01 μm to 100 μm or 500 μm; and the second (mechanical) layer has a thickness ranging from 0.01 μm to 100 μm or 500 μm. More generally, the first and second layers can independently have any desired thickness on the substrate. In common applications, the coating has a thickness ranging from 0.010 μm to 100 μm or 500 μm, in particular from 5 μm or 10 μm to 50 μm or 100 μm, for example at least 0.01, 2, 5, 10, 20, 50, or 100 μm and/or up to 20, 50, 100, 200, or 500 μm. Typical cast coatings can have thicknesses of 5 μm or 10 μm to 50 μm or 100 μm. Typical spin coatings can have thicknesses of 0.05 μm or 0.10 μm to 0.20 μm or 0.50 μm. Multiple coating layers can be applied to substrate to form even thicker layers of the composition (e.g., above 500 μm or otherwise) if desired. The first and second layers can have any desired relative thicknesses to balance self-healing properties (e.g., primarily from the first layer) and mechanical properties (e.g., primarily from the second layer). For example, the first layer can have a thickness of at least 0.1, 0.2, 0.5, 0.8, 1, 1.2, 1.5, 2, 3, or 5 and/or up to 0.2, 0.5, 0.8, 1, 1.2, 1.5, 2, 3, 5, 8, or 10 times the thickness of the second layer. Likewise, the second layer can have a thickness of at least 0.1, 0.2, 0.5, 0.8, 1, 1.2, 1.5, 2, 3, or 5 and/or up to 0.2, 0.5, 0.8, 1, 1.2, 1.5, 2, 3, 5, 8, or 10 times the thickness of the first layer.

In another aspect, the disclosure relates to a coated article comprising: (a) a substrate; and (b) a self-healing laminate composition coated on a surface of the substrate, wherein the first layer is closer to the substrate than the second layer. The self-healing laminate composition is generally as described above in any of the variously disclosed embodiments.

Various refinements of the disclosed coated article are possible.

In a refinement, the substrate is selected from the group consisting of metals, plastics, foams, a different polymer material, glass, wood, fabric (or textile, leather), cellulose, lignocellulose, and ceramics. In another refinement, the substrate comprises a metal selected from aluminum, copper (e.g., bronze alloy with tin, brass alloy with zinc), steel (e.g., stainless steel), alloys thereof, and combinations thereof. The substrate is not particularly limited, and generally can be formed from any material desired for protection with a self-healing coating, in particular given the good, broad adhesive capabilities of the composition. For example, the substrate can be a metal, plastic, a different polymer material (e.g., a primer material; material other than the self-healing omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), Polyvinyl chloride (PVC), Polyvinyledene chloride (PVDC), Polystyrene (PS), starch, chitosan, etc. Suitable wood materials can be any type of wood commonly used in home, office, and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, another primer coating, etc.), and the self-healing composition on the one or more intermediate coatings as the final, external coating on the coated article.

In a refinement, the substrate comprises a different polymer material from that of the first layer. This can represent a situation in which the self-healing first layer is an inner layer sandwiched between two other layers (e.g., non-healing layers). The substrate in this case can be considered a third (mechanical) layer, which is analogous to the second layer, but could be the same or different material as the second layer. This can provide both second and third layers with puncture resistance and self-healing properties.

In a refinement, the first (self-healing) layer has a thickness ranging from 0.01 μm to 100 μm or 500 μm; and the second (mechanical) layer has a thickness ranging from 0.01 μm to 100 μm or 500 μm.

In another aspect, the disclosure relates to a method for forming a coated article, the method comprising: applying a first (self-healing) layer over a substrate, the first layer comprising a self-healing polymer; and applying a second (mechanical) layer over the first layer, the second layer comprising a polymer selected from the group consisting of a crosslinked (e.g., thermoset) polymer, a thermoplastic polymer, a functional thermoset polymer (e.g., omniphobic thermoset, etc.), and combinations thereof. The first layer can be applied directly on the substrate, or indirectly on the substrate, such as with one or more other intervening layers between the substrate and first layer. Likewise, the second layer can be applied directly on the first layer, or indirectly on the first layer, such as with one or more other intervening layers between the first layer and second layer.

Various refinements of the disclosed coating method are possible.

In a refinement, the self-healing polymer comprises: (i) first backbone segments having a structure corresponding to at least one of a urethane reaction product and a urea reaction product from at least one polyisocyanate; (ii) second backbone segments having a structure corresponding to at least one of a urethane reaction product and a urea reaction product from at least one reversible polyfunctional linker comprising at least one of a hindered secondary amino group and an aromatic hydroxy group; and (iii) first linking groups reversibly linking the first backbone segments and the second backbone segments, the first linking groups comprising at least one of (A) a reversible urea reaction product between the polyisocyanate and the hindered secondary amino group of the reversible polyfunctional linker and (B) a reversible urethane reaction product between the polyisocyanate and the aromatic hydroxy group of the reversible polyfunctional linker.

In a refinement, applying the first layer over the substrate comprises: applying a first mixture over the substrate, the first mixture comprising the at least one polyisocyanate and the at least one reversible polyfunctional linker; and reacting the first mixture to form the first layer (e.g., curing to form the self-healing polymer reaction product). In embodiments where the first layer and self-healing polymer need not be crosslinked, it is also possible to first form the self-healing polymer, and then apply/cast the self-healing polymer onto the substrate such as at a temperature above melting or as a solution in a suitable solvent. In a further refinement, the method comprises performing one or more of spraying, casting, rolling, and dipping to apply the first mixture over the substrate. In a further refinement, the first mixture further comprises a solvent. The solvent can be an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In a further refinement, the method comprises reacting the first mixture to form the self-healing polymer (i) at temperature from 20° C. to 150° C. (e.g., at least 0° C., 20° C., 40° C., or 60° C. and/or up to 20° C., 30° C., 40° C., 60° C., 80° C., 100° C., or 150° C.) and (ii) for a time from 1 min to 300 min or 5 min to 300 min (e.g., 1, 2, 5, or 10 min to 20, 40, 60, 120, or 300 min). In other cases, such as at ambient curing conditions, the reaction time can be as high as 24, 48, or 72 hr.

In a refinement, applying the second layer over the first layer comprises: applying a second mixture over the first layer, the second mixture comprising the two or more thermosetting components; and reacting the second mixture to form the second layer (e.g., curing to form the crosslinked polymer reaction product). In a further refinement, the second mixture comprises at least one second polyisocyanate and at least one second polyol. In a further refinement, the second mixture comprises at least one second polyisocyanate, at least one second polyol, and at least one second reversible polyfunctional linker comprising at least one of a hindered secondary amino group and an aromatic hydroxy group. In a further refinement, the method further comprises performing one or more of spraying, casting, rolling, and dipping to apply the first mixture over the substrate. In a further refinement, the second mixture further comprises a solvent. The solvent can be an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. A reaction catalyst such as salts of tin (e.g., tin(II) 2-ethylhexanoate) or iron, and tertiary amines (e.g., triethylamine) can be included in the mixture, for example to catalyze the reaction between a polyisocyanate and a polyol as the first and second thermosetting components to form a thermoset polyurethane. In a further refinement, the method comprises reacting the second mixture to form the crosslinked polymer (i) at temperature from 20° C. to 150° C. (e.g., at least 0° C., 20° C., 40° C., or 60° C. and/or up to 20° C., 30° C., 40° C., 60° C., 80° C., 100° C., or 150° C.) and (ii) for a time from 1 min to 300 min or 5 min to 300 min (e.g., 1, 2, 5, or 10 min to 20, 40, 60, 120, or 300 min). In embodiments where the second layer and corresponding polymer are not crosslinked, for example as thermoplastic top layer, it is also possible to apply/cast the polymer for the second layer onto the first layer, such as in the form of a film, a liquid at a temperature above melting, or as a solution in a suitable solvent.

In another aspect, the disclosure relates to a method for repairing a self-healing laminate composition, the method comprising: (a) providing a self-healing laminate composition according to any of the disclosed embodiments or a coated article according to any of the disclosed embodiments and comprising the self-healing laminate composition, wherein the second layer of the self-healing laminate composition has at least one instance of surface damage; and (b) heating the surface-damaged self-healing laminate composition for a time sufficient and at a temperature sufficient to at least partially repair the at least one instance of surface damage (e.g., by at least partially rejoining separated surfaces and at least partially reforming first linking groups at the rejoined separated surfaces; heating can be an externally applied thermal source, or it can be sufficient high ambient temperatures it high-temperature usage environments). In many cases, there is at least some damage to the underlying first, self-healing layer to facilitate repair. That is, if a cut or scratch is so shallow that it does not penetrate through the second, top layer into the first, bottom layer, the driving force for self-healing can be reduced.

Various refinements of the disclosed repair method are possible.

In a refinement, the at least one instance of surface damage is selected from the group consisting of cuts, punctures, dents, scratches, and combinations thereof. Suitably, a cut or puncture should be less than about 3 mm in width or diameter, otherwise the damage could be too severe to repair via the self-healing mechanism. For example, the cut or puncture can have an initial width or diameter of at least 0.01, 0.1, 1, 10, 20, 50, or 100 µm and/or up to 1, 10, 20, 50, 100, 200, 500, 1000 or 10000 µm and be successfully repaired. The length of the corresponding cut is not particularly limited and can have any value (i.e., with the lesser (width) dimension of the damage being the limiting factor). Similarly, a scratch should be less than about 10 mm in width or diameter, otherwise the damage could be too severe to repair via the self-healing mechanism. For example, the scratch can have an initial width or diameter of at least 0.01, 0.1, 1, 10, 20, 50, 100, 1000 µm and/or up to 1, 10, 20, 50, 100, 200, 500, 1000, 2000, 5000, or 10000 µm and be successfully repaired. The length of the corresponding scratch is not particularly limited and can have any value (i.e., with the lesser (width) dimension of the damage being the limiting factor). For any of the various damage types, the depth of the surface damage is not particularly limited and can have any value.

In a refinement, the method comprises heating the surface-damaged self-healing laminate composition for a time in a range from 1 min to 72 hours (e.g., 5 min to 30 min, 6 hr, or 24 hr). For example, suitable heating times can be at least 1, 2, 5, 10, 30, 60, or 120 min and/or up to 0.2, 0.5, 1, 2, 4, 6, 12, 24, 48, or 72 hr.

In a refinement, the method comprises heating the surface-damaged self-healing laminate composition at a temperature in a range from 18° C. to 150° C. In some cases, the temperature sufficient for repair can include ambient temperatures, for example heating or otherwise exposing the damaged omniphobic composition to a temperature of at least 18, 20, or 25° C. and/or up to 20, 25, or 30° C. When heating to elevated temperatures above ambient conditions, suitable temperatures can include at least 40, 60, 80, or 100° C. and/or up to 60, 80, 100, or 120° C. For compositions including reversible urea bonds, particularly suitable temperatures can range from 18° C.-40° C. for relatively short treatment times (e.g., up to about 10 min). For compositions including reversible urethane bonds, particularly suitable temperatures can range from 100° C.-120° C. for relatively short treatment times (e.g., up to about 10 min).

While the disclosed compositions, articles, methods, and apparatus, are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to a self-healing laminate composition. The composition includes a first, self-healing layer with a self-healing polymer and a second, mechanical layer adjacent to the first layer. The second layer includes any desired polymer, for example a crosslinked polymer, a thermoplastic polymer, or a functional thermoset polymer. The self-healing polymer includes polymer backbone segments with reversible linking groups characterized by one or more of non-covalent interactions, coatings with trapped unreacted reagents, dynamic covalent bonds, and thermoreversible bonds. Self-healing polymers with dynamic covalent bonds are particularly suitable, for example those with dynamic urea bonds and/or dynamic urethane bonds. A self-healing polymer that is damaged with a cut, puncture, etc. can undergo autonomous repair when separated surfaces re-contact each other due to the soft nature of the self-healing polymer, whereupon reversible bonds can reform to rejoin and repair the damaged self-healing polymer. When the self-healing laminate according to the disclosure is damaged, for example including surface damage to the top second layer and bottom first layer, the self-healing mechanism of the first layer can cause the repair of both layers. As the first layer undergoes self-healing repair, the process causes the separated surfaces in the second layer also to be drawn nearer to each other, resulting in their eventual re-contact and repair. The self-healing laminate composition can be used as a coating on any of a variety of substrates to provide self-healing properties to a surface of the substrate. The self-healing composition can be applied by different coating methods including cast, spin, roll, spray and dip coating methods.

Omniphobic Composition

Figure 1:
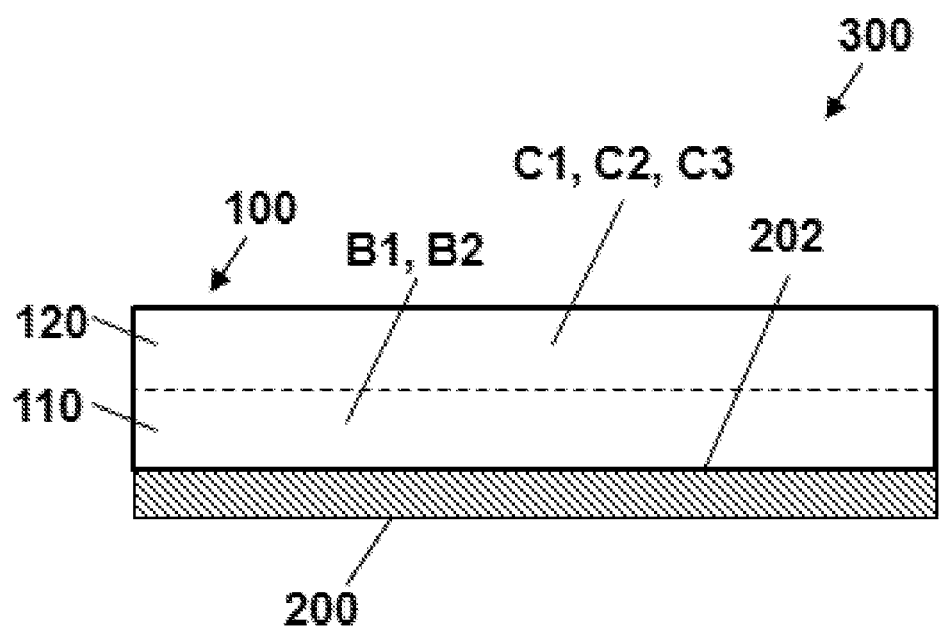
FIG. 1 illustrates a illustrates a self-healing laminate composition and corresponding coated article according to the disclosure.
Figure 2:
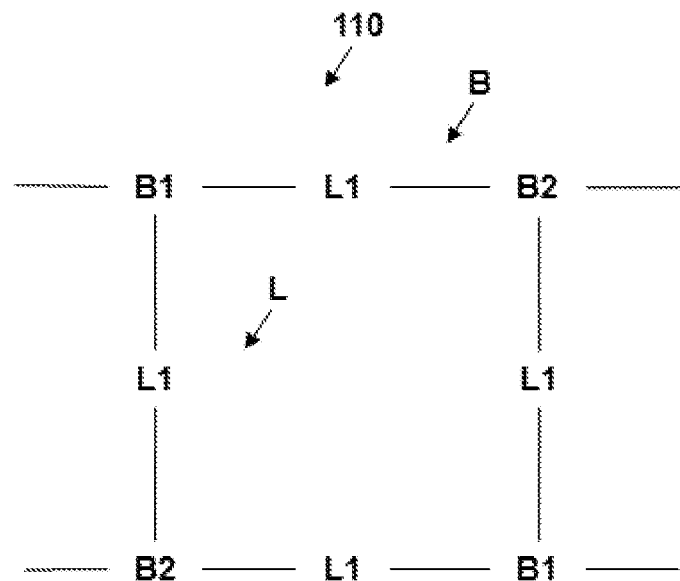
FIG. 2 illustrates a self-healing laminate composition first layer according to an embodiment of the disclosure.
Figure 3:
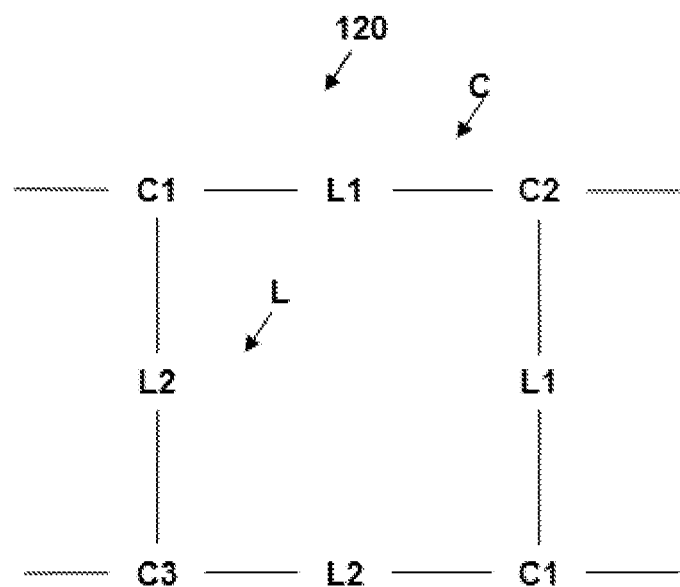
FIG. 3 illustrates a self-healing laminate composition second layer according to another embodiment of the disclosure.

FIGS. 1-3 illustrate self-healing laminate compositions 100 according to the disclosure. The self-healing laminate composition 100 generally includes a first layer 110 as a self-healing layer. The first layer 110 includes a self-healing polymer as described below. The composition 100 further includes a second layer 120 as a mechanical layer to control or select mechanical or other properties of the composition 100. The second layer 120 is adjacent to the first layer 110. The second layer 120 can include any desired polymer, for example a crosslinked (e.g., thermoset) polymer, a thermoplastic polymer, a functional thermoset polymer (e.g., omniphobic thermoset, etc.), etc. The second layer 120 can include polymer blends and/or multiple sub-layers of one or more generally non-self-healing polymers, although the second layer 120 can include some self-healing functionality. The first layer 110 is generally a bottom or lower layer, not being exposed to the external environment during use. The first layer 110 can be attached/bound/applied to a substrate 200 in a corresponding article 300. The first layer 110 can be closer to the substrate 200 than the second layer 120 in the article 300, for example when there are one or more other intervening layers between the substrate 200 and the first layer 110 (e.g., adhesion layers or other layers). Conversely, the second layer 120 is generally a top or upper layer, being exposed to the external environment during use. The second layer 120 is generally not attached/bound/applied to a substrate 200 in a corresponding article 300. The second layer 120 can be farther from the substrate 200 than the first layer 110 in the article 300.

In an embodiment, the self-healing polymer in the first layer 110 includes backbone segments with reversible linking groups along the backbone, which correspond to reversible bond reaction products. The reversible linking groups and corresponding reversible bonds can include those on non-covalent interactions, such as hydrogen bonding, high-valence metal chelation, and/or host-guest interactions. An example of reversible hydrogen bonding linkages include ether-thiourea moieties. Another example of a non-covalent reversible bonding system includes self-healing copolymers such as poly (methyl methacrylate)/n-butyl acrylate (p (MMA/nBA)) exhibiting van der Waals forces such as for key-and-lock interactions. The reversible linking groups and bonds can include coatings with trapped unreacted reagents, which, when released upon damage, can react and re-form new bonds. The reversible linking groups and bonds can include dynamic covalent bonds, such as disulfide-bonds, acylhydrazone bonds, nitroxides, bonds formed via Diels-Alder addition or trans-esterification reactions, dynamic urea bonds, and/or dynamic urethane bonds. A reversible disulfide linkage can be represented by RS-SR, where R can be an aromatic, aliphatic, or acyclic group as generally described herein. Reversible disulfide linkages can be incorporated into a polyurethane, polyurea, polyepoxy, or polyester framework, for example. The reversible linking groups and bonds can include thermoreversible bonds. More generally, the reversible bonding can be thermally, mechanically, or UV triggerable.

The polymer of the second layer 120 is not particularly limited. In an embodiment, the second layer 120 polymer includes a crosslinked polymer such as a thermoset polyurethane, a thermoset epoxy, or a hybrid thermoset such as siloxane-urethane. In another embodiment, the second layer 120 polymer includes a thermoplastic polymer, such as a poly(ethylene terephthalate) (PET), a polylactide (PLA), a poly(vinyl acetate) (PVAc), or a polypropylene (PP). In a particular embodiment the second layer 120 polymer is a functional thermoset polymer, such as an omniphobic epoxy, an omniphobic urethane, an anti-rust top organic, an inorganic or hybrid thermoset, an anti-ice thermoset, an anti-smudge thermoset, or an anti-microbial thermoset, for example including general thermoset polymers with one or more of functional additives incorporated therein.

FIG. 2 illustrates the first layer 110 of the composition 100 according to an embodiment of the disclosure. More specifically, FIG. 2 qualitatively illustrates various backbone segments (B) and linking groups (L) in a self-healing polymer forming the first layer 110. As illustrated, the first layer 110 polymer includes a crosslinked backbone B, which in turn includes (i) first backbone segments B1, (ii) second backbone segments B2, and (iii) first linking groups L1 (e.g., reversible urethane (or carbamate), urea) reversibly linking first backbone segments and second backbone segments.

The various backbone segments and linking groups can include the reaction products resulting from polymerization of the corresponding monomer, oligomer, or polymer units. The first backbone segments B1 can result from a polyisocyanate (e.g., monomer, oligomer, or polymer). The second backbone segments B2 can result from a reversible polyfunctional linker, which can be a di-, tri-, or higher functionality linker or crosslinker, for example having two, three, or more total amino/hydroxy groups for reaction with the polyisocyanate. The amino/hydroxy groups in the reversible linker can include the hindered secondary amino group or aromatic hydroxy group for reversible bond formation. The linking groups can generally include urea or urethane groups, which can be reversible linking groups (e.g., first linking groups L1), Urethane (or carbamate) groups and be represented by the general structure —NR$_1$—C(=O)O—, where R$_1$ can be H or a C$_1$-C$_{12}$ linear, branched, or cyclic substituted or unsubstituted hydrocarbon group, such as an aliphatic (e.g., alkyl, alkenyl) group or an aromatic group, or a combination of different R$_1$ groups (such as when multiple different reactive components are used). Urea groups can be represented by the general structure —NR$_2$—C(=O)—NR$_3$—, where R$_2$ and R$_3$ independently can be H or a C$_1$-C$_{12}$ linear, branched, or cyclic substituted or unsubstituted hydrocarbon group, such as an aliphatic (e.g., alkyl, alkenyl) group or an aromatic group, or a combination of different R$_2$ and/or R$_3$ groups (such as when multiple different reactive components are used).

The first backbone segments B1 can result from a polyisocyanate (e.g., monomer, oligomer, or polymer) after it has reacted with the reversible polyfunctional linker. The first backbone segments B1 can result from a single polyisocyanate or a blend of two or more different polyisocyanate species with the same or different degree of functionality, but each being able to react with the other components. For example, the first backbone segments B1 can have a structure corresponding to at least one of a urethane reaction product and a urea reaction product from at least one polyisocyanate (e.g., diisocyanate, triisocyanate, or higher degree of isocyanate functionality) with a hydroxyl-functional (urethane) or an amine-functional (urea) component. The first backbone segments B1 can result from a single polyisocyanate (e.g., a diisocyanate, a triisocyanate) species or a blend of two or more different polyisocyanate species with the same or different degree of isocyanate functionality.

The polyisocyanate is not particularly limited and generally can include any aromatic, alicyclic, and/or aliphatic isocyanates having at least two reactive isocyanate groups (—NCO). Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In an embodiment, the polyisocyanate includes a diisocyanate. Suitably, the polyisocyanate for the first backbone segments B1 of the self-healing polymer in the first layer 110 is a diisocyanate. This can desirably limit or prevent crosslinking in the self-healing polymer, which can be desirable to provide a self-healing polymer that is generally soft or flexible to promote re-contact and self-healing of damaged and separated areas, in particular at ambient temperatures. When the polyisocyanate includes three or more isocyanate groups, the functionality of the polyfunctional linker should be selected with a sufficient number of complementary reacting aromatic hydroxy or hindered secondary amino groups for reversible bonding with the isocyanate groups to retain self-healing properties.

In a particular embodiment, the polyisocyanate can include a polyurethane prepolymer diisocyanate. The polyurethane prepolymer diisocyanate can be a (linear) polyurethane prepolymer with two terminal isocyanate groups at opposing ends. The polyurethane prepolymer can be suitable for promoting compatibility with the second layer 120, for example when the second layer 120 is itself a polyurethane polymer or otherwise includes urethane groups. The polyurethane prepolymer suitably includes polyether backbone segments (e.g., polytetrahydrofuran segments, ethylene oxide segments) to provide flexibility to the self-healing polymer in the first layer 110. The polyurethane prepolymer diisocyanate can be a reaction product between a polyether diol of the general formula HO((CH$_2$)$_m$O)$_n$H, where n can be from 2 to 20, 4 to 16, or 6 to 12 and m can be 2 to 8, 2 to 4, or 2, and a diisocyanate (e.g., hexane 1,6-diisocyanate (HDI) or others as described herein) in sufficient amount to react with both diol hydroxy groups, thus providing two terminal isocyanate groups and two urethane groups per prepolymer unit. The polyisocyanate prepolymers can include those with a sub-ambient glass transition temperature (T$_g$) or with an above-ambient T$_g$. Polyisocyanate prepolymers with sub-ambient T$_g$ values are suitable for laminate compositions that are intended to be self-healing at ambient temperature conditions (e.g., 0-40° C. or 10-30° C.). Polyisocyanate prepolymers with above-ambient T$_g$ values are suitable for laminate compositions that are intended to be self-healing at higher temperature conditions (e.g., 30-150° C. or 40-120° C.), for example as a result of higher normal use temperatures of the composition or for compositions intended to have an external applied thermal treatment/heating for self-healing. The polyisocyanate prepolymers suitably have an Mw ranging from about 500-10000 g/mol.

In an embodiment, the polyisocyanate includes a triisocyanate. In some embodiments, the polyisocyanate for the first backbone segments B1 of the self-healing polymer in the first layer 110 includes a triisocyanate, for example in combination with a diisocyanate. The inclusion of a tri- or higher functionality polyisocyanate can introduce some crosslinking into the self-healing polymer, for example to improve the mechanical strength of the first layer. Suitably, such crosslinking is a relatively low level to retain a generally flexible character of the self-healing polymer. When the polyisocyanate includes three or more isocyanate groups, the functionality of the polyfunctional linker should be selected with a sufficient number of complementary reacting aromatic hydroxy or hindered secondary amino groups for reversible bonding with the isocyanate groups to retain self-healing properties. When the polyisocyanate both a diisocyanate and a tri- or higher isocyanate, the tri- or higher isocyanate is suitably present in an amount from 0.01 to 20 mol. % (e.g., at least 0.01, 0.1, 0.2, 0.5, or 1 mol. % and/or up to 1, 2, 3, 5, 7, 10, 15, or 20 mol. %) relative to total polyisocyanates in the self-healing polymer. The relative isocyanate content of the tri- or higher isocyanates relative to total polyisocyanates can reflect the relative amounts of polyisocyanate monomers/oligomers/prepolymers etc. used to form the self-healing polymer and/or the relative amounts of the different first backbone segments corresponding to the different polyisocyanates in the self-healing polymer.

Te second backbone segments B2 can result from a reversible polyfunctional linker after it has reacted with the polyisocyanate. The reversible polyfunctional linker can be a di-, tri-, or higher functionality linker or crosslinker, for example having two, three, or more total amino/hydroxy groups for reaction with the polyisocyanate, in particular hindered secondary amino groups and/or aromatic hydroxy groups. In an embodiment, the second backbone segments B2 can have a structure corresponding to a reversible urea reaction product between a polyisocyanate or a polymeric polyisocyanate and the hindered secondary amino group of the reversible polyfunctional linker. In an embodiment, the second backbone segments B32 can have a structure corresponding to a reversible urethane reaction product between a polyisocyanate or a polymeric polyisocyanate and the aromatic hydroxy group of the reversible polyfunctional linker. The second backbone segments B2 can result from a reversible polyfunctional linker or a blend of two or more different reversible polyfunctional linkers.

In an embodiment, the reversible polyfunctional linker includes one or more hindered secondary amino groups, for example one, two, or more than two hindered secondary amino groups. The hindered secondary amino group generally has a structure of $R_1(NH)R_2G$. $R_1$ can generally include any sterically hindering group, for example a hydrocarbon or other group having from 1 to 18 carbon atoms (e.g., at least 1, 2, 3, 4 and/or up to 4, 6, 8, 10, 12, or 18 carbon atoms). For example, $R_1$ can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring). Specific examples for $R_1$ include $C_1$-$C_4$ alkyl, such as isopropyl, sec-butyl, and tert-butyl. Other examples for $R_1$ include aryl, $(C_1$-$C_{20})$alkyl, $(C_4$-$C_{10})$cyclolalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, and $(C_2$-$C_{20})$alkyl-PEG-$(C_2$-$C_{20})$alkyl, with or without an intervening linking carbon between the foregoing groups and the —NH— group. The group —NH— corresponds to the secondary nitrogen atom/amino group. $R_2$ can generally include any linking group to at least one other amino or hydroxy group(s) G that is capable of reacting with the polyisocyanate to form a corresponding urea or urethane group, respectively, which urea or urethane group can be a reversible or irreversible. $R_2$ likewise can be an alkyl or alkenyl (e.g., linear or branched), cycloalkyl or cycloalkenyl, or aromatic or heteroaromatic group (e.g., with 1, 2, or 3 N, O, S, or P heteroatoms in an aromatic structure with carbon atoms). Specific examples for $R_2$ include $C_1$-04 alkylene, such as methylene, ethylene, propylene, and butylene. Other examples for $R_2$ include $(C_1$-$C_{100})$alkyl, $(C_1$-$C_{20})$alkyl, $(C_4$-$C_{10})$cyclolalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, $(C_1$-$C_{20})$alkylO$(C_1$-$C_{20})$alkyl, $(C_1$-$C_{20})$alkylS$(C_1$-$C_{20})$alkyl, —N$(R_1)$—, =N—, —C$(X)_2$— (X is halo), —NC(=O)$(C_1$-$C_{20})$alkyl, —C(=O)$(C_1$-$C_{20})$alkyl-, —C(=O(NR$_1$)—, —S(=O)$_2$O—, —S(=O)$_2$—$(C_1$-$C_{20})$alkyl-, —OS(=O)$_2$O$(C_1$-$C_{20})$alkyl-, —S(=O)$_2$NR$_1$—, —S(=O)$(C_1$-$C_{20})$alkyl-, —P(=O)(OR$_1$)O—, —C(S)—$(C_1$-$C_{20})$alkyl-, —C(=O)O$(C_1$-$C_{20})$alkyl-, —C(=O)O—, —C(=S)O$(C_1$-$C_{20})$alkyl-, —C(=O)S$(C_1$-$C_{20})$alkyl-, —C(=S)S$(C_1$-$C_{20})$alkyl-, —C(=O)NR$_1$—$(C_1$-$C_{20})$alkyl-, and —C(=NR$_1$)NR$_1$—.

In a particular embodiment where the reversible polyfunctional linker has two (e.g., only two) two hindered secondary amino groups, the structure can be represented by $R_1(NH)R_2(NH)R_3$. $R_3$ can be any sterically hindering group analogous to $R_1$, for example according to any of the above definitions for $R_1$, but $R_1$ and $R_3$ can be the same or different. In some embodiments, secondary amines can be part of separate or the same ring structures. For example, when having one or more secondary amines, a ring size can have of 3 to 16 carbons atoms. In terms of the above structures, a formula of $R_1(NH)R_2G$ can represent a cyclic secondary amine when $R_1$ and $R_2$ together form a ring, such as a $(C_1$-$C_{20})$alkyl$(C_4$-$C_{10})$cycloalkyl in 2,2,6,6-tetramethyl-4-piperidinol. Likewise, a formula of $R_1i(NH)R_2(NH)R_3$ can represent a bicyclic secondary amine when $R_1$ and $R_2$ together form a first ring and when $R_2$ and $R_3$ together form a second ring. In a particular embodiment where the reversible polyfunctional linker has one hindered secondary amino group (e.g., contains only one hindered secondary amino group), the structure can be represented by $R_1(NH)R_2(NH_2)$ or $R_1(NH)R_2(OH)$. $R_1$ and $R_2$ can be as described above. Examples of suitable reversible polyfunctional linkers include N,N'-di(t-butyl) ethylenediamine, N,N'-di(iso-propyl) ethylenediamine and N,N'-di(iso-butyl) ethylenediamine. Additionally, hindered amine compounds carrying reactive groups such as hydroxyl can be used for reversible urea-urethane systems (e.g., 2,2,6,6-Tetramethyl-4-piperidinol).

In an embodiment, the reversible polyfunctional linker includes one or more aromatic hydroxy groups, for example one, two, or more than two aromatic hydroxy groups. The aromatic hydroxy group includes a hydroxy (OH) group bound directly to an aromatic or heteroaromatic group (e.g., with 1, 2, or 3 N, O, S, or P heteroatoms in an aromatic structure with carbon atoms, such as a 5-, 6-, 7-, 8-, 9-, 10-, or higher membered ring), for example including a phenolic group or hydroxyphenyl group. The aromatic hydroxy group can include multiple hydroxy groups bound to the same aromatic or heteroaromatic group (e.g., as in the case of a gallic acid derivative), for example where the polyfunctional linker has only one aromatic or heteroaromatic group but multiple hydroxy groups attached thereto for at least two aromatic hydroxy groups. In some other embodiments, the aromatic hydroxy group can include two or more aromatic or heteroaromatic groups linked together, each with one or more hydroxy groups attached thereto (e.g., such as for a bisphenol compound having two hydroxyphenyl groups). In a particular embodiment, the reversible polyfunctional linker can be represented by the general structure (HO)AR$_2$(NH$_2$) or (HO)AR$_2$(OH). A is an aromatic or heteroaromatic group as described above, and $R_2$ can be as described above for the hindered amine. Examples of suitable reversible polyfunctional linkers include gallic acid esters (e.g., propyl gallate), benzene diols (e.g., 1,4-benzenediol, 1,3-benzenediol, 1,2-benzenediol), halo-substituted benzene diols (e.g., 2-chloro-1,4-benzenediol), alkyl-substituted benzene diols (e.g., 2-methyl-1,4-benzenediol), bisphenols (e.g., bisphenol A, bisphenol F), ubiquiniol, genistein, gallic acid, pyrogailol, aloe emodin, and poly(caffeic acid methyl ester). In certain cases, one or more hydroxy groups can be attached to a non-aromatic carbon and one or more hydroxy groups can be attached to an aromatic ring such as in polytyrosol. Natural polymers such as lignin that has aromatic and aliphatic hydroxy groups can be used as reversible polyfunctional linker for a self-healing urethane. In such cases, the aliphatic hydroxy groups of the lignin suitably will be first protected (e.g., acetylated), thus leaving only aromatic hydroxy groups for reversible urethane bond formation.

In various embodiments, the first linking groups L1 can include reversible bonds linking their respective backbone segments, for example reversible urea bonds or reversible urethane bonds. The reversible urea bonds generally include a reversible urea reaction product between an isocyanate functional group (e.g., in the polyisocyanate) and a hindered secondary amino group (e.g., in the reversible polyfunctional linker). The reversible urethane bonds generally include a reversible urethane reaction product between an isocyanate functional group (e.g., in the polyisocyanate) and an aromatic hydroxy group (e.g., in the reversible polyfunctional linker). The self-healing omniphobic polymer has a crosslinked backbone with a network structure of covalent bonds, which is characteristic of a thermoset polymer. Because of the presence of the reversible bonds, the omniphobic polymer can be additionally characterized as a reversible thermoset or vitrimer polymer that can flow similarly to a (viscoelastic) liquid at relatively high temperatures and that can behave as a conventional thermoset (solid) at relatively lower temperatures.

The reversible urea reaction product generally corresponds to a urea reaction product in dynamic equilibrium between the isocyanate groups of the polyisocyanate forming the first backbone segments and the hindered secondary amino group of the reversible polyfunctional linker. The equilibrium is substantially shifted to the urea reaction product (e.g., at least 50%, 60%, 70%, 80%, 90% and/or up to 80%, 90%, 95%, 98%, 99, or 99.99% of isocyanate and secondary amino groups are in urea form), but at least some of the isocyanate and secondary amino groups are unreacted (e.g., at least 1%, 2%, 5%, 10%, or 20% and/or up to 20%, 30%, 40%, or 50% of isocyanate and secondary amino groups are unreacted), which unreacted groups exist due to the equilibrium between dynamic urea bond. The equilibrium is dynamic as a result of steric hindrance from the secondary amino group, resulting in a continuous breaking and reforming of the urea bonds between different isocyanate and secondary amino groups, even at normal use temperatures. Self-healing can be accelerated by heating a damaged composition because it accelerates the equilibrium reaction (although it need not necessarily shift the equilibrium toward more or fewer urea groups) and softens the composition without melting or destroying it. A softened composition promotes polymer chains contact at a damaged interface between different regions of the composition, whereupon the dynamic urea bonds can re-form at the damaged interface to rejoin the separated portions of the composition.

The reversible urethane reaction product generally corresponds to a urethane reaction product between the isocyanate groups of the polyisocyanate forming the first backbone segments and the aromatic hydroxy group of the reversible polyfunctional linker. In contrast to the reversible urea bond, the reversible urethane bond need not be in equilibrium, dynamic or otherwise (e.g., substantially all of the isocyanate and aromatic hydroxy groups are in urethane form). The bond is reversible in that the application of heat to the composition can break the reversible urethane bond to re-form the isocyanate and aromatic hydroxy groups because of the ability of the aromatic group to which the hydroxy group is attached to delocalize and stabilize a negative charge when the urethane bond first breaks. Heating can also bring about an equilibrium state between the urethane, isocyanate, and aromatic hydroxy groups at the higher temperatures, but which equilibrium state did not exist at normal use temperatures. Self-healing can be thus effected by heating a damaged omniphobic composition because it breaks at least some urethane groups and softens the composition without melting or destroying it. A softened composition promotes contact at a damaged interface between different regions of the composition, whereupon the reversible urethane bonds can re-form at the damaged interface to rejoin the separated portions of the composition, which urethane bonds remain and continue to form as it cools.

The self-healing polymer of the first layer 110 can have a glass transition temperature ($T_g$) of 45° C. or less. The self-healing polymer is suitably soft, for example having a $T_g$ below ambient use temperatures and is a non-crystalline or have very little crystallinity. This facilitates physical contact between otherwise separate polymer chains at a damage site in self-healing polymer. Suitably, the glass transition temperature ($T_g$) is at least −100, −50, −20, 0, 20, or 30° C. and/or up to −20, 0, 10, 15, 20, 30, 45, 50, 80, 100, or 150° C. A $T_g$ of 45° C. or less is particularly suitably for ambient self-healing, considering that ambient use temperatures can be as high as about 50° C. in some applications, in which the polymer can self-heal with ease. For non-ambient healing, the $T_g$ can be higher, such as at least or up to 30, 50, 80, or 150° C.

In an embodiment, the polymer of the second layer 120 includes some self-healing functionality. This can result when the second layer 120 polymer is any of a crosslinked polymer, a thermoplastic polymer, or a functional thermoset polymer, in particular when it is the crosslinked polymer or the functional thermoset polymer (e.g., a functional crosslinked polymer). FIG. 3 illustrates the first layer 120 of the composition 100 according to such an embodiment. More specifically, FIG. 3 qualitatively illustrates various crosslinked backbone segments (C) and linking groups (L) in a second layer 120 polymer. As illustrated, the second layer 120 polymer includes a crosslinked backbone C, which in turn includes (i) first crosslinked backbone segments C1, (ii) second crosslinked backbone segments C2, (iii) third crosslinked second backbone segments C3, (iv) first linking groups L1 irreversibly linking first backbone segments and second backbone segments, and (v) second linking groups L2 (e.g., reversible urethane (or carbamate), urea) reversibly linking first backbone segments and third backbone segments. The third second backbone segments C3 and the second linking groups L2 are optional. In an embodiment without the third second backbone segments C3 and the second linking groups L2, the second layer 120 polymer does not include reversible bonds or self-healing behavior.

The various backbone segments and linking groups can include the reaction products resulting from polymerization of the corresponding monomer, oligomer, or polymer units. The first crosslinked backbone segments C1 can result from a polyisocyanate (e.g., monomer, oligomer, or polymer). The second crosslinked backbone segments C2 can result from a polyol (e.g., monomer, oligomer, or polymer). The third crosslinked second backbone segments C3 can result from a reversible polyfunctional linker, which can be a di-, tri-, or higher functionality linker or crosslinker, for example having two, three, or more total amino/hydroxy groups for reaction with the polyisocyanate. The linking groups can generally include urea or urethane groups, which can be irreversible linking groups (e.g., first linking group L1 reaction polyisocyanate/polyol reaction product) or reversible linking groups (e.g., second linking group L2 polyisocyanate/reversible polyfunctional linker reaction product), The polyisocyanate and reversible polyfunctional linker that can be used in the second layer 120 can include any of those described above for use in the first layer 110.

In an embodiment, the polyisocyanate used in the second layer 120 can include a tri- or higher isocyanate. The polyisocyanates in the two layers 110, 120 can be the same or different. Suitably, the second layer 120 polyisocyanate is a tri- or higher isocyanate to promote (dense) crosslinking and mechanical strength for the second layer 120. In other cases, the second layer 120 polyisocyanate can be a diisocyanate, for example when the second layer 120 polyol has tri- or higher hydroxy functionality to promote crosslinking.

The polyol is not particularly limited and generally can include any aromatic, alicyclic, and/or aliphatic polyols having at least two reactive hydroxyl groups (—OH). Suitable polyols contain on average 2-4 hydroxyl groups. In some embodiments, the polyol incudes a diol. In some embodiments, the polyol incudes a triol or higher polyol. The polyol can be a triol or higher polyol to promote crosslinking, regardless of whether the polyisocyanate is difunctional. Examples of specific polyols include polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, polyester polyols, and polyurethane polyols. The polyol additionally can be a biobased polyol.

The third crosslinked backbone segments C3 and the second linking groups L2 are suitably present in second layer 120 polymer to impart some self-healing character thereto. For example, the reversible polyfunctional linker of the backbone segments C3 can include the hindered secondary amino group or the aromatic hydroxy group. The reversible polyfunctional linker for the second layer 120 generally can include any of the reversible polyfunctional linkers listed above for the first self-healing layer 110. The reversible polyfunctional linkers in the two layers 110, 120 can be the same or different. Alternatively or additionally, the second layer 120 reversible polyfunctional linker can present in an amount from 0.1 to 20 mol. % (e.g., at least 0.1, 0.2, 0.5, 1, or 2 mol. % and/or up to 2, 3, 5, 7, 10, 15, or 20 mol. %) reversible reactive groups (e.g., hindered secondary amino group and/or aromatic hydroxy group) relative to total isocyanate groups in the crosslinked polymer. The relative reactive groups content of the reversible polyfunctional linker relative to total isocyanate groups can reflect the relative amounts of reversible polyfunctional linkers and polyisocyanates used to form the crosslinked polymer and/or the relative amounts of the third crosslinked backbone segments C3 to the first crosslinked backbone segments C1 in the crosslinked polymer. Alternatively or additionally, the ratio of isocyanate:hydroxy:reversible group (e.g., NCO:polyol OH:2° amino or aromatic hydroxy) can range from 1:0.999:0.001 to 1:0.8:0.2, 1:0.99:0.01 to 1:0.9:0.1, or 1:0.98:0.02 to 1:0.95:0.05.

In an embodiment, the second (mechanical) layer 120 can include one or more low $T_g$ (e.g., −150° C. to +50° C.) omniphobic polymers as an additive. The functionalized omniphobic polymer is not particularly limited and generally can include any omniphobic polymer with glass transition temperature of 70° C. or 50° C. or less, such as in a range from −150° C. to 70° C. or 50° C. The functional group of the functionalized omniphobic polymer can include one or more amino groups and hydroxyl groups (e.g., including only one type of functional group), which can react with the polyisocyanate of the second layer 120 to incorporate the functionalized omniphobic polymer into the second layer 120. Examples of general classes of functionalized omniphobic polymers include functionalized polysiloxanes, functionalized polyperfluoroethers, functionalized polybutadienes, functionalized polyolefins (e.g., polyethylene, polypropylene, polybutylene), and combinations or mixtures thereof. The functionalized omniphobic polymers can be in the form of homopolymers with functional groups (e.g., PDMS-NH$_2$). The functionalized omniphobic polymers can be in the form of block copolymers with other organic monomeric or polymeric units having functional groups (e.g., PDMS-b-(single/multi acrylate with amine groups)). The functionalized omniphobic polymers can be in the form of random copolymers such as using PDMS di/single acrylate copolymerized with various vinyl monomers, in which case some monomers can include reactive functional groups such as an amine group. The functionalized polyperfluoroether (e.g., functionalized polyperfluoropolyethers) can include mono-, di-, or higher functionalized polyperfluoroethers, or a blend of thereof, such as a blend of mono- and di-functional polyperfluorothers. The functionalized polybutadiene can include mono-, di-, or higher functional polybutadienes, or a blend of thereof, such as a blend mono- and di-functional polybutadienes. Many suitable functionalized omniphobic polymers are commercially available (e.g., amine-, isocyanate-, or other functional polydimethylsiloxane (PDMS) with a variety of available degrees of functionality and molecular weights). Omniphobic polymers that are not commercially available in their functionalized form can be functionalized using conventional chemical synthesis techniques, for example including but not limited to hydroamination, thiol-ene Michael reaction of amine-carrying thiols, Mitsunobu reaction, and reductive amination.

As shown in FIG. 1, the second layer 120 can be directly adjacent to the first layer 110. The first and second layers 110, 120 can be in direct contact (e.g., bound, adhered) with each other. In some cases, the first and second layers 110, 120 can be indirectly adjacent to each other, for example when one or more intervening layers (not shown) are present between the first and second layers 110, 120. Such intervening layers could be a tie layer or other polymeric or adhesive layer to promote compatibility/adhesion between the first and second layers 110, 120, for example when they are not particularly compatible. For example with a urethane or urea-urethane healable first (bottom) layer 110 and a polypropylene second (top) layer 120, a poly(ethylene vinyl alcohol) polymer can be a suitable tie layer.

The first and second layers 110, 120 can generally have any desired thickness, whether as a stand-alone composition 100 or as applied to a substrate 200. In a particular embodiment, the first (self-healing) layer has a thickness ranging from 0.01 μm to 500 μm, and the second (mechanical) layer has a thickness ranging from 0.01 μm to 500 μm. In common applications, the coating has a thickness ranging from 0.010 μm to 100 μm or 500 μm, in particular from 5 μm or 10 μm to 50 μm or 100 μm, for example at least 0.01, 2, 5, 10, 20, 50, or 100 μm and/or up to 20, 50, 100, 200, or 500 μm. Typical cast coatings can have thicknesses of 5 μm or 10 μm to 50 μm or 100 μm. Typical spin coatings can have thicknesses of 0.05 μm or 0.10 μm to 0.20 μm or 0.50 μm. Multiple coating layers can be applied to substrate 200 to form even thicker layers of the composition 100 (e.g., above 500 μm or otherwise) if desired. The first and second layers 110, 120 can have any desired relative thicknesses to balance self-healing properties (e.g., primarily from the first layer 110) and mechanical properties (e.g., primarily from the second layer 120). For example, the first layer 110 can have a thickness of at least 0.1, 0.2, 0.5, 0.8, 1, 1.2, 1.5, 2, 3, or 5 and/or up to 0.2, 0.5, 0.8, 1, 1.2, 1.5, 2, 3, 5, 8, or 10 times the thickness of the second layer 120. Likewise, the second layer 120 can have a thickness of at least 0.1, 0.2, 0.5, 0.8, 1, 1.2, 1.5, 2, 3, or 5 and/or up to 0.2, 0.5, 0.8, 1, 1.2, 1.5, 2, 3, 5, 8, or 10 times the thickness of the first layer 110.

In an embodiment, the self-healing laminate composition 100 can include any suitable organic or inorganic filler or additive, which can be included to improve one or more of mechanical properties, optical properties, electrical properties, and omniphobic properties of the final composition. The fillers or additives can be included in one or both of the first layer 110 and second layer 120. Examples of suitable fillers or additives include nanoclay, graphene oxide, graphene, graphite (e.g., ground), silicon dioxide (silica), aluminum oxide, cellulose nanocrystals, carbon nanotubes, zirconia, titanium dioxide (titania), diatomaceous earth, biocides, pigments, dyes, thermoplastics, low and high molecular weight poly(ethylene oxide), salts (e.g., tetra alkyl ammonium), non-ionic ingredients (e.g., non-surfactants such as TWEEN or polysorbate 80, TWEEN or polysorbate 85), polyhedral oligomeric silsesquioxane (POSS) and POSS derivatives, and functional agents (e.g., antistatic agents, UV blockers). The additives can be nano-scale (nanofillers) or micro-scale (microfillers). The additives can be included in the coating composition 100 in a range from 0.01 to 50 wt. %, for example at least 0.01, 0.1, 0.2, 0.5, 1, 2, 5, or 10 wt. % and/or up to 1, 2, 5, 10, 15, 20, 35, or 50 wt. %, whether in the composition 100 as a whole, the first layer 110 individually, and/or the second layer 120 individually. The additives can improve thermal conductivity of the corresponding coating, for example including graphene oxide, (ground) graphite, etc. The additives can improve the mechanical properties of the corresponding coating, such as wear-resistance, for example for coatings including zirconia, silica, titania, POSS, etc. In various embodiments, these additives may or may not form chemical bonds with one or more components of the self-healing laminate composition 100. Fillers (such as nanosilica) added to the first layer 120 can improve adhesion to the substrate 200, and also can improve the compression resistance of the laminate structure.

Coated Article

FIG. 1 illustrates an aspect of the disclosure in which a coated article 300 includes a substrate 200 and the self-healing laminate composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the self-healing laminate composition 100 provides protection to the underlying substrate 200. As shown, the first layer 110 of the composition 100 is closer to the substrate 200 than the second layer 120. The first layer 110 can be directly applied to the substrate 200 surface 202, or there can be one or more intervening layer (e.g., for adhesion or otherwise) between the first layer 110 and the substrate 200.

The substrate 200 is not particularly limited, and generally can be formed from any material desired for protection, in particular given the good, broad adhesive capabilities of the self-healing laminate composition 100. For example, the substrate can be a metal, plastic, a different polymer material (e.g., a primer material; material other than the other than thermoset omniphobic composition), glass, wood, fabric (or textile), cellulose, lignocellulose, or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the self-healing laminate composition 100 on the one or more intermediate coatings as the final, external coating on the coated article 300.

In an embodiment, the substrate 200 is formed from or otherwise includes a polymer material that is a different polymer material from that of the first layer 110. For example, the self-healing first layer 110 can be an inner layer sandwiched between two other layers (e.g., non-healing layers). The substrate 200 in this case can be considered a third (mechanical) layer, which is analogous to the second layer 120, but could be formed from the same or different materials as the second layer 120. This can provide both second and third layers with puncture resistance and self-healing properties.

The self-healing laminate composition 100 can have any desired thickness on the substrate 200. In common applications, the composition 100 has a thickness ranging from 0.010 μm to 100 μm or 500 μm, for example at least 0.01, 10, 20, 50, or 100 μm and/or up to 100, 200, or 500 μm. Typical cast coatings can have thicknesses of 10 μm to 100 μm. Typical spin coatings can have thicknesses of 0.05 μm or 0.10 μm to 0.20 μm or 0.50 μm. Multiple coating layers can be applied to substrate 200 to form even thicker layers of the composition 100 (e.g., above 500 μm or otherwise) if desired. The relative thicknesses of the first and second layers 110, 120 are not particularly limited. For example, the first and second layers 110, 120 can each independently have a thickness ranging from 0.010 μm to 100 μm or 500 μm, for example at least 0.01, 10, 20, 50, or 100 μm and/or up to 100, 200, or 500 μm.

Methods of Making and Use

The composition 100 and corresponding article 300 can be formed by any suitable coating and/or polymerization methods. Suitably, a first layer 110 according to any of the disclosed embodiments is applied over a substrate 200 top surface 202. The first layer 110 can be formed from or include a self-healing polymer as disclosed herein. A second layer 120 is then applied over the first layer 110. The second layer 120 is generally a mechanical layer providing desired mechanical properties to the composition 100 or article 300. The second layer 120 can be formed from or include a crosslinked (e.g., thermoset) polymer, a thermoplastic polymer, a vitrimer, a composite, a functional thermoset polymer (e.g., omniphobic thermoset, anti-dirt, etc.), for example. The first layer 110 can be applied directly on the substrate 200, or indirectly on the substrate 200, such as with one or more other intervening layers between the substrate 200 and first layer 110. Likewise, the second layer 120 can be applied directly on the first layer 110, or indirectly on the first layer 110, such as with one or more other intervening layers between the first and second layers 110, 120.

In an embodiment, the self-healing polymer of the first layer 110 generally can be formed by first reacting the polyisocyanate(s) and the reversible polyfunctional linker(s) to form a partially crosslinked (e.g., not fully crosslinked) reaction product, and then curing the partially crosslinked reaction product to form the self-healing first layer 110, for example after application to a substrate 200 to provide a coating thereon. In embodiments where the first layer 110 and self-healing polymer need not be crosslinked, it is also possible to first form the self-healing polymer, and then apply/cast the self-healing polymer onto the substrate 200 such as at a temperature above melting or as a solution in a suitable solvent. Application of the first layer 110 components can include spraying, casting, rolling, dipping, etc. of the components, for example in a mixture including a solvent. The solvent can be an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, a reaction catalyst such as salts of tin (e.g., tin(II) 2-ethylhexanoate) or iron, and tertiary amines (e.g., triethylamine) can be used to catalyze the reaction between an isocyanate group and a hydroxy group. Curing can be performed by heating (e.g., in an oven, with exposure to a heat lamp, etc.) or without heating (e.g., an ambient or room temperature). The mixture of first layer 110 components are reacted to form the self-healing polymer. Suitable reaction temperatures range from 20° C. to 150° C., for example at least 0° C., 20° C., 40° C., or 60° C. and/or up to 20° C., 30° C., 40° C., 60° C., 80° C., 100° C., or 150° C. Suitable reaction times range from 1 min to 300 min or 5 min to 300 min, for example at least 1, 2, 5, or 10 min and/or up to 20, 40, 60, 120, or 300 min. In other cases, such as at ambient curing conditions, the reaction time can be as high as 24, 48, or 72 hr.

In an embodiment, the mechanical polymer of the second layer 120 can be a thermoset polymer. A mixture of corresponding thermosetting components is applied over the first layer 110 and then reacted to form the second layer 120, for example by curing to form the crosslinked polymer reaction product corresponding to the second layer 120. In a particular embodiment, the thermosetting components forming the second layer 120 can include a polyisocyanate, a polyol, and (optionally) a reversible polyfunctional linker, which components can be the same as or different from those used when forming the first layer 110. Application of the second layer 110 components can include spraying, casting, rolling, dipping, etc. of the components, for example in a mixture including a solvent. The solvent can be an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, a reaction catalyst such as salts of tin (e.g., tin(II) 2-ethylhexanoate) or iron, and tertiary amines (e.g., triethylamine) can be used to catalyze the reaction between an isocyanate group and a hydroxy group. Curing can be performed by heating (e.g., in an oven, with exposure to a heat lamp, etc.) or without heating (e.g., an ambient or room temperature). The mixture of second layer 120 components are reacted to form the mechanical polymer. Suitable reaction temperatures range from 20° C. to 150° C., for example at least 0° C., 20° C., 40° C., or 60° C. and/or up to 20° C., 30° C., 40° C., 60° C., 80° C., 100° C., or 150° C. Suitable reaction times range from 1 min to 300 min or 5 min to 300 min, for example at least 1, 2, 5, or 10 min and/or up to 20, 40, 60, 120, or 300 min. In embodiments where the second layer 120 and its corresponding polymer are not crosslinked, for example as a thermoplastic top layer, it is also possible to apply/cast the polymer for the second layer 120 onto the first layer 110, such as in the form of a film, a liquid at a temperature above melting, or as a solution in a suitable solvent such as those above or otherwise.

The disclosure further relates to methods for repairing damaged self-healing laminate compositions 100 and related articles 300. Damage is typically in the form of cuts, punctures, dents, scratches, etc., for example on an external surface of the composition 100 serving as a coating for a substrate 200 or other coated article 300, in particular damage on the second layer 120 of the composition 100. In many cases, prior to repair, there is at least some damage to the underlying first, self-healing layer 110 to facilitate repair. That is, if a cut or scratch is so shallow that it does not penetrate through the second, top layer 120 into the first, bottom layer 110, the driving force for self-healing can be reduced. The surface-damaged self-healing laminate composition 100 can be heated for a time sufficient and at a temperature sufficient to at least partially repair the surface damage by rejoining separated surfaces and reforming first (reversible) linking groups at the rejoined separated surfaces. The repair of the damaged surface can be essentially complete such that there is no remaining outward visual indication of the original surface damage after repair. An optical microscope along a scale can be used to observe and measure the degree of healing and recovery, for example can by measuring cut width before and after healing. Suitable healing times can range from 1 min to 72 hours, such as 5 min to 30 min, 6 hr, or 24 hr. More generally, suitable heating times can be at least 1, 2, 5, 10, 30, 60, or 120 min and/or up to 0.2, 0.5, 1, 2, 4, 6, 12, 24, 48, or 72 hr.

As noted above, surface damage can general include any combination of cuts, punctures, dents, scratches, etc. Suitably, a cut or puncture should be less than about 3 mm in width or diameter, otherwise the damage could be too severe to repair via the self-healing mechanism. For example, the cut or puncture can have an initial width or diameter of at least 0.01, 0.1, 1, 10, 20, 50, or 100 µm and/or up to 1, 10, 20, 50, 100, 200, 500, 1000 or 10000 µm and be successfully repaired. The length of the corresponding cut is not particularly limited and can have any value (i.e., with the lesser (width) dimension of the damage being the limiting factor). Similarly, a scratch should be less than about 10 mm in width or diameter, otherwise the damage could be too severe to repair via the self-healing mechanism. For example, the scratch can have an initial width or diameter of at least 0.01, 0.1, 1, 10, 20, 50, 100, 1000 µm and/or up to 1, 10, 20, 50, 100, 200, 500, 1000, 2000, 5000, or 10000 µm and be successfully repaired. The length of the corresponding scratch is not particularly limited and can have any value (i.e., with the lesser (width) dimension of the damage being the limiting factor). For any of the various damage types, the depth of the surface damage is not particularly limited and can have any value.

Heating the surface-damaged composition for repair can be performed as variety of suitable temperature, for example at a temperature in a range from 18° C. to 150° C. In some cases, the temperature sufficient for repair can include ambient temperatures, for example heating or otherwise exposing the damaged omniphobic composition to a temperature of at least 18, 20, or 25° C. and/or up to 20, 25, or 30° C. When heating to elevated temperatures above ambient conditions, suitable temperatures can include at least 40, 60, 80, or 100° C. and/or up to 60, 80, 100, or 120° C. For compositions including reversible urea bonds, particularly suitable temperatures can range from 18° C.-40° C. for relatively short treatment times (e.g., up to about 10 min). For compositions including reversible urethane bonds, particularly suitable temperatures can range from 100° C.-120° C. for relatively short treatment times (e.g., up to about 10 min).

EXAMPLES

The examples illustrate the disclosed compositions and methods, but are not intended to limit the scope of any claims thereto. In the examples, self-healing laminate compositions generally according to the disclosure are prepared and applied as a film or coating on a test substrate such as glass or metal. Examples 1 and 2 provide illustrative examples of self-healing laminate compositions including a self-healing polyurethane with dynamic urea bonds in the first layer and a variety of different thermoplastic and thermoset polymers in the second layer. The applied films or coatings can then be evaluated according to a variety of tests as described below in order to characterize their self-healing and other properties.

Example 1

Self-Healing Laminate Compositions on Glass Substrates

Example 1 provides illustrative self-healing laminate structures according to the disclosure. Self-healing polyurethane coatings were generally applied to a glass substrate, and then a top layer polymeric coating (e.g., thermoset or thermoplastic) was applied to the underlying self-healing coating. The coated articles exhibited good self-healing and other properties.

Materials: An isocyanate-terminated PU-prepolymer (ANDUR 75 DPLF; Mn=~930 g/mol, NCO content=9.03 wt %) and hexamethylene diisocyanate trimer (UH80; HDIT, NCO content=17.36%) were supplied by a manufacturer and used as received. 2,2,6,6-tetramethyl-4-piperidinol (available from Sigma Aldrich), and N,N"-Di-tert-butylethanediamine (available from Sigma Aldrich) were used as comonomers having hindered secondary amino groups. Tetrahydrofuran (THF; Sigma Aldrich) and US3 (mixture of 2-btuanone, 2-pentanone, ethoxy propionate, and n-butyl acetate; Sherwin-Williams) were used as solvents. Top layers were variously formed from commercially available polymers including polylactic acid (PLA), polyethylene terephthalate (PET), vinyl acetate, a polyester, and CC939 (thermoset polyurethane available from Sherwin-Williams). Monohydroxy-terminated polydimethylsiloxane (PDMS-OH; Mn=~4600; Sigma Aldrich) and Monoamino-terminated polydimethylsiloxane (PDMS-NH2; Mn=~2500; Sigma Aldrich) were used as comonomers for modification of the top coating for improved water resistance. A hindered amine light stabilizer (TINUVIN 249; BASF) and surface modified clay (Sigma Aldrich) were used as coating additives.

Figure 4:
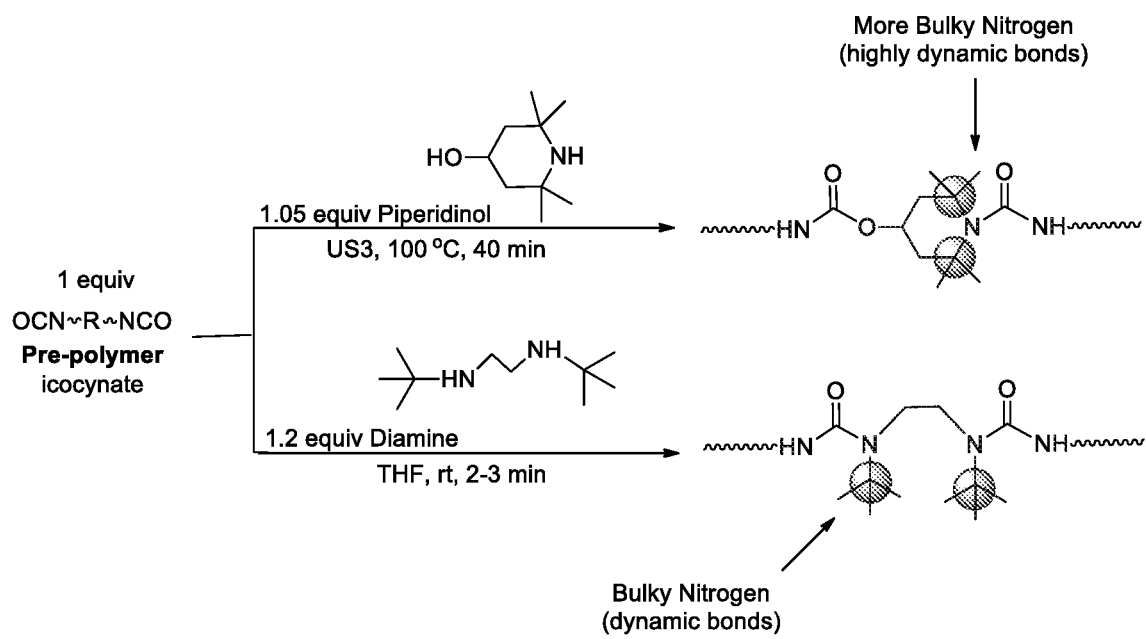
FIG. 4 illustrates components used to make a self-healing layer according to an embodiment of the disclosure.

Synthesis of Self-Healing Bottom Layer (Piperindol): As a general procedure for making a polyurethane (PU)-based bottom layer, a PU-prepolymer (ANDUR 75 DPLF; 1.00 g, 1.075 mmol, 1.00 equiv) was dissolved in US3 solvent (4 mL), and the mixture was charged to 20 ml vial. Next, 2,2,6,6-tetramethyl-4-piperidinol (0.177 g, 1.13 mmol, 1.05 equiv) was added to the above solution at room temperature. The temperature of the reaction mixture was increased to 100° C. and stirred for 40-50 min. After the reaction, 1 ml of this solution was cast on a glass slide (2.54 cm×7.62 cm) or a metal substrate, and then maintained at room temperature for 5-6 h, followed by heating at 120° C. for 2 h to remove the residual solvent prior to evaluation and testing. The general reaction and product are illustrated in FIG. 4 (top).

Synthesis of Self-Healing Bottom Layer (Diamine): As a general procedure for making a polyurethane (PU)-based bottom layer, N, N"-Di-tert-butylethanediamine (0.222 g, 1.29 mmol, 1.2 equiv) was dissolved in THF (2 mL), and the mixture was charged to 20 ml vial. To the above solution, PU-prepolymer (ANDUR 75 DPLF; 1.00 g, 1.075 mmol, 1.00 equiv) dissolved in THF (2 mL) was added dropwise. The reaction mixture was stirred for 3-4 min at room temperature. After the reaction, 1 ml of this solution was cast on a glass slide (2.54 cm×7.62 cm) or a metal substrate, and then maintained at room temperature to remove all the visible solvent for 2-3 h, followed by heating at 70° C. for 2 h to cure and remove the solvent prior to evaluation and testing. The general reaction and product are illustrated in FIG. 4 (bottom).

Top layer coatings having a thickness of about 12-60 μm were applied to the self-healing bottom layers above. Specific thermoplastic or thermoset top layers used listed in Table 1. Procedures for making the thermoset layers (CC939), with or without PDMS modification, are detailed below.

TABLE 1

Top Layer Coatings for Example 1

| Top Layer | Thickness (in microns) |
| --- | --- |
| PLA | 40 |
| PET 1 | 51 |
| CC939 | 40-50 |
| Vinyl acetate | 60 |
| Polyester | 12 |

Synthesis of Top Layer Thermoset (CC939): HDIT (1.0 mL, 5.7 mmoles of NCO) was added to a glass vial (20 mL) with a stir bar, followed by the addition of THF (2.0 mL). To the above solution, polyol CC939 (4.0 mL, 5.6 mmol) and tin (II) ethylhexanoate catalyst (5.0 mg) were added, and the solution was stirred at room temperature for 1 hour. Next, about 0.3-0.4 mL of this solution was casted on the pre-coated surface (i.e., a diamine- or piperidnol-based self-healing layer as described above), and then maintained at room temperature to remove all the visible solvent for 2-3 h, followed by heating at 70° C. for 2 h to cure the top layer and remove the solvent prior to evaluation and testing. In some examples, about 1% (approximately 30 mg) of an anti-static additive (e.g., TINUVIN-249 or surface modified clay) was added to the reaction mixture and incorporated into the coating.

Synthesis of Top Layer Functionalized Thermoset (CC939-PDMS-NH2): HDIT (1.0 mL, 5.7 mmoles of NCO) was added to a glass vial (20 mL) with a stir bar, followed by the addition of THF (1.0 mL). To the above solution, polyol CC939 (4.0 mL, 5.6 mmol) and tin (II) ethylhexanoate catalyst (5.0 mg) were added, and the solution was stirred at room temperature for 1 hour. Next, 1% of PDMS-NH2 (approximately 30 mg) dissolved in THF (1 mL) was added dropwise to the above solution, and the reaction mixture was stirred for 1 hour. Next, about 0.3-0.4 mL of this solution was casted on the pre-coated surface (i.e., a diamine- or piperidnol-based self-healing layer as described above), and then maintained at room temperature to remove all the visible solvent for 2-3 h, followed by heating at 70° C. for 2 h to cure the top layer and remove the solvent prior to evaluation and testing.

Synthesis of Top Layer Functionalized Thermoset (CC939-PDMS-OH): HDIT (1.0 mL, 5.7 mmoles of NCO) was added to a glass vial (20 mL) with a stir bar, followed by the addition of THF (1.0 mL). To the above solution, 1% (approximately 30 mg) PDMS-OH (hydroxy terminated PDMS) dissolved in THF (1 mL) was added, and the solution was stirred for 10 min. Next, a tin (II) ethylhexanoate catalyst (5.0 mg) was added, and the solution was stirred at room temperature for 1 hour. At this point of reaction, polyol CC939 (4.0 mL, 5.6 mmol) was added to the mixture and stirred for 2 hours. Next, about 0.3-0.4 mL of this solution was casted on the pre-coated surface (i.e., a diamine- or piperidnol-based self-healing layer as described above), and then maintained at room temperature to remove all the visible solvent for 2-3 h, followed by heating at 70° C. for 2 h to cure the top layer and remove the solvent prior to evaluation and testing.

Figure 5:
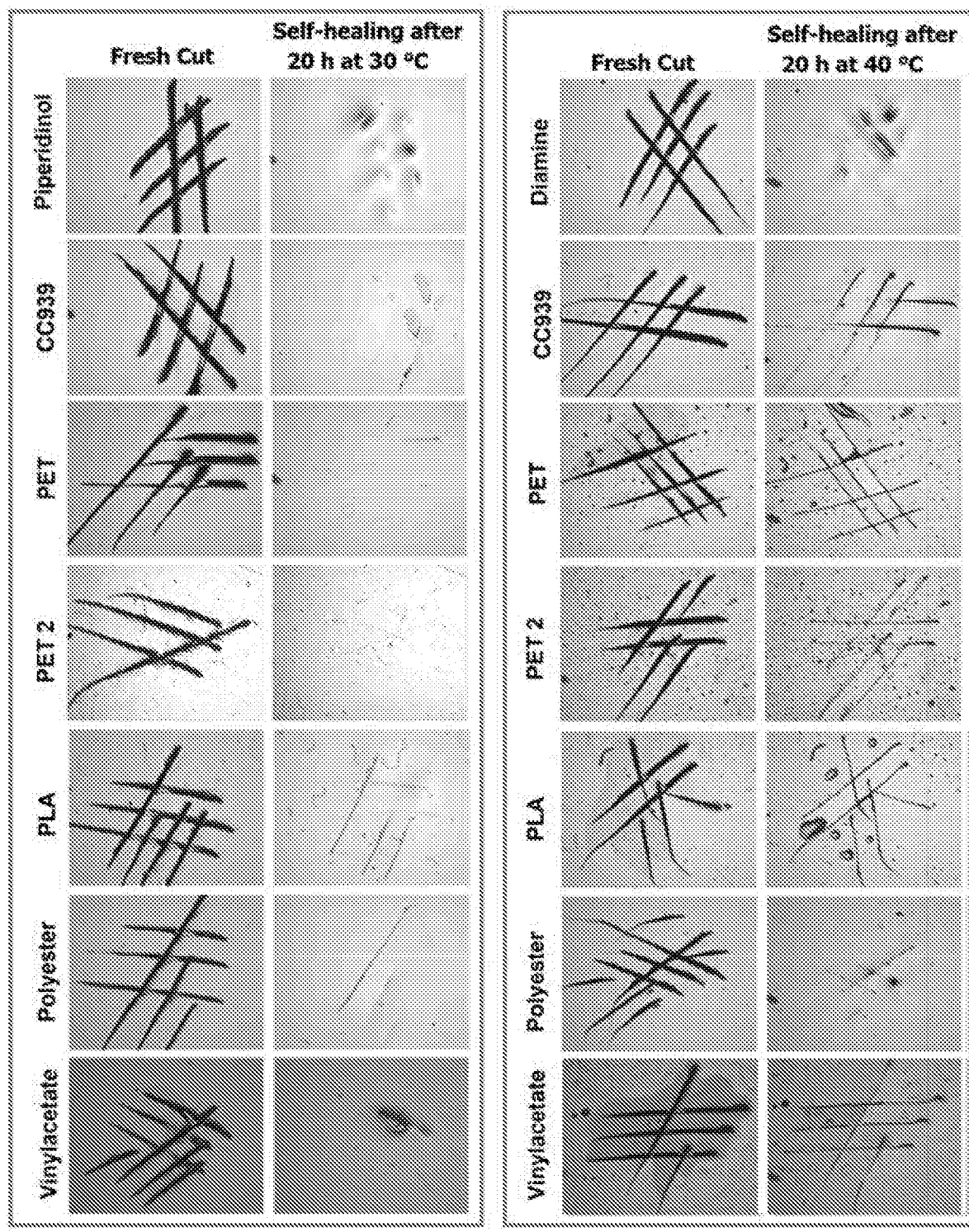
FIG. 5 includes photographs illustrating self-healing behavior for laminate compositions according to the disclosure.

Results: In this example, a metal surface or glass slide was first coated with a self-healing polyurethane as described above, including both piperidinol- and diamine-based self-healing bottom layers. The bottom layer was designed with the ability to self-heal at about room temperature where the reversible dynamic bonds of the polyurethane network can be thermally self-repair, for example even at 30 to 40° C. in only few hours. The self-healing abilities of the piperidinol-based layer is excellent at 30° C. after a few hours, while the diamine-based layer exhibits good self-healing abilities at 34° C. after a few hours. A top protective layer was added over the bottom, self-healing layer. The top layer not only increased the mechanical properties of the overall coating, but it also improved properties like its amphiphobic, anti-smudge, anti-static and anti-rust properties for the double layer coating. Tables 2 and 3 below summarize the properties of the PU coating alone ("1L" or single layer) or in combination with various thermoplastic or thermoset top layer coatings ("2L" our double layer). To observe the self-healing properties of the coatings, some blade cuts were made with a razor blade. Each cut was approximately of ~200 μm deep (cut of both layers) and ~30-40 μm wide. The various coated substrates for piperidinol- and diamine-based self-healing bottom layers were maintained at 30° C. and 40° C., respectively, to test their self-healing properties, and the results are shown in FIG. 5, with the single-layer coatings shown in the top row, and the double-layer coatings shown in the subsequent rows.

The mechanical stability, tensile strain, and energy break values of the single-layer (reference) and double-layer coatings were measured using an Instron tensile testing apparatus. The different values obtained are summarized in Tables 2 and 3. The PLA top layer exhibited the highest modulus, while the polyester top layer exhibited the lowest modulus, although the polyester also had the thinnest top layer (about 12 μm). Vinylactate exhibited the highest tensile stain. When using piperidinol-based self-healing bottom layer, the modulus as well as energy break values were decreased relative to the diamine-based self-healing bottom layer. However, in most cases the tensile strain properties were increased using piperidinol relative to diamine. The tensile properties of the single-layer piperidinol-based self-healing layer were not determined because of its low mechanical strength as a stand-alone coating.

TABLE 2

Tensile Properties of the Piperindol-2L Coatings for Example 1

| | Top Layer | Tensile strain at Break (Standard) (%) | Tensile stress at Break (Standard) (MPa) | Tensile strain at Yield (Zero Slope) (%) | Tensile stress at Yield (Zero Slope) (MPa) | Modulus (Automatic) (MPa) | Energy at Break (Standard) (J) |
|---|---|---|---|---|---|---|---|
| 1 | PLA | 84.58338 | 31.74415 | 9.16744 | 44.16158 | 741.18407 | 0.29197 |
| 2 | PET 1 | 187.11165 | 37.27434 | 9.35226 | 26.57007 | 622.94928 | 2.48946 |
| 3 | CC939 | 8.25459 | 25.15443 | Not measured | Not measured | 596.27219 | 0.05673 |
| 4 | Vinyl acetate | 1060.55589 | 8.40177 | 14.16185 | 7.61769 | 180.84209 | 2.72854 |
| 5 | Polyester | 78.26626 | 15.11048 | 72.03619 | 18.46136 | 70.13060 | 0.27571 |

TABLE 3

Tensile Properties of the Diamine-2L Coatings for Example 1

| | Top Layer | Tensile strain at Break (Standard) (%) | Tensile stress at Break (Standard) (MPa) | Tensile strain at Yield (Zero Slope) (%) | Tensile stress at Yield (Zero Slope) (MPa) | Modulus (Automatic) (MPa) | Energy at Break (Standard) (J) |
|---|---|---|---|---|---|---|---|
| 1 | PLA | 67.900 | 22.887 | 6.110 | 21.380 | 792.000 | 0.535 |
| 2 | PET 1 | 147.422 | 43.537 | 9.097 | 31.290 | 689.090 | 5.137 |
| 3 | CC939 | 10.741 | 25.688 | Not measured | Not measured | 630.698 | 0.046 |

TABLE 3-continued

Tensile Properties of the Diamine-2L Coatings for Example 1

|   | Top Layer | Tensile strain at Break (Standard) (%) | Tensile stress at Break (Standard) (MPa) | Tensile strain at Yield (Zero Slope) (%) | Tensile stress at Yield (Zero Slope) (MPa) | Modulus (Automatic) (MPa) | Energy at Break (Standard) (J) |
|---|---|---|---|---|---|---|---|
| 4 | Vinyl acetate | 905.069 | 9.780 | 16.667 | 10.825 | 201.349 | 4.175 |
| 5 | Polyester | 67.888 | 9.559 | 68.55 | 15.415 | 88.422 | 0.299 |
| 6 | Diamine (1 L) | 382.36070 | 1.05995 | 256.11065 | 2.03386 | 4.42118 | 0.61102 |

Figure 6:
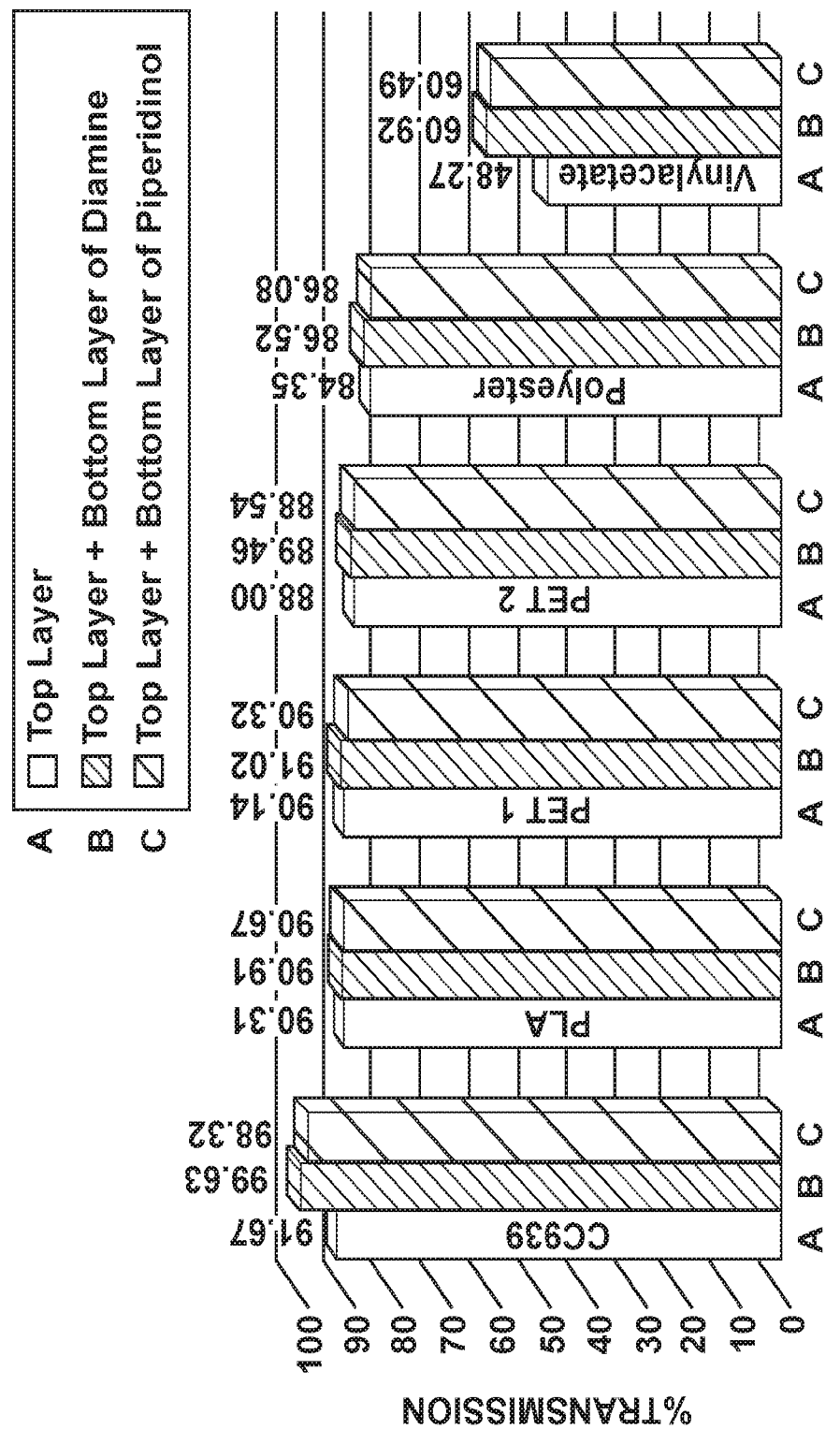
FIG. 6 is a graph showing transmittance values for laminate compositions according to the disclosure.

Optical transmittance: One goal was to provide a self-healing bottom layer coating that would not adversely affect the transparency of the top layer coating, such that the laminate structure overall would be transparent (e.g., or at least have substantially the same degree of transparency as the top layer alone). In this example, the transparency of a top layer coating was measured both alone and in combination with a piperidinol- or diamine-based self-healing layer. The percent transmittance (% T) of the samples were recorded using a Perkin Elmer LAMBDA 25 UV-Vis spectrometer at a wavelength of 550 nm. In all cases, the bottom layer enhanced the clarity as well as its visibility. Air was used as a reference in all cases. The results are summarized in FIG. 6, which shows that the diamine-based self-healing layers have a relatively larger transmission values relative to piperidinol.

Water, Oil, and Chemical Resistance: Low sliding angles are a desirable feature of smooth omniphobic coatings. For two functionalized top layers, an environmentally friend cleaning agent (PDMS) was added to the top layer to enhance its self-cleaning properties. Water, oil and ethanol liquid drops were measured on the surface for sliding angles. The size of drop for water was approximately 50 microliters for water, and 10 microliters for oil and ethanol. The results are summarized in Table 4. The PDMS-OH-functionalized top layers showed improved performance over the PDMS-NH2 (2.5K)-functionalized top layers. The selection of a particular self-healing bottom layer did not substantially affect the top layer sliding angles.

Ink Test: Different markers of permanent ink were used to determine its chemical resistivity and self-cleaning effects of the top layer (CC939) with PDMS (CC939-PDMS-OH and CC939-PDMS-NH2) and without PDMS (CC939; control). Both PDMS-NH2 and PDMS-OH exhibited good repellency for different inks/chemicals, while the control exhibited poor repellency.

Contact Angle Measurements: Contact angles were also measured for PDMS-functionalized top layers. A surface having a contact angle greater than 90° exhibits good omniphobic properties. Both PDMS-NH2 and PDMS-OH exhibited good contact angles, with PDMS-OH having higher angles relative to PDMS-NH2. the selected four samples (Piperidinol-2L-PDMS-NH2, The results are summarized in Table 5.

TABLE 5

Contact Angle Measurements for Example 1

| Top Layer | Diamine as lower layer | Piperidinol as lower layer |
|---|---|---|
| PDMS-OH | 106.17 ± 0.41 | 106.9 ± 0.40 |
| PDMS-NH$_2$ | 99.07 ± 1.08 | 98.7 ± 0.014 |

Anti-Static Measurements: To introduce some additional properties to the top layer (CC939), some anti-static additives including TINUVIN 249 and surface-modified clay were added. Next, this top modified coated was cast on a piperidinol- or diamine-based self-healing bottom layer to perform dirt-, silica-, and carbon black-repellency tests. Visibility/percent transmission were measured by UV-Vis as described above to evaluate repellency to the various surface contaminants applied to the top layer. The coated surfaces showed the best repellency to silica. The TINUVIN-249-modified surface had a high repellency to silica and the visibility was decreased by about 1% relative to the CC939 coating without an additive. The results are summarized in Table 6.

TABLE 4

Sliding Angle Measurements for Example 1

| | Water | | Oil | | Ethanol | |
|---|---|---|---|---|---|---|
| Top Layer | Diamine as lower layer | Piperidinol as lower layer | Diamine as lower layer | Piperidinol as lower layer | Diamine as lower layer | Piperidinol as lower layer |
| PDMS-OH | 14.66 ± 0.33 | 14.66 ± 0.33 | 12 ± 0.00 | 11.66 ± 0.33 | 12 ± 0.66 | 12 ± 0.66 |
| PDMS-NH$_2$ | 17.66 ± 0.33 | 18 ± 0.00 | 15.33 ± 0.88 | 14.66 ± 0.33 | 13 ± 0.00 | 13 ± 0.66 |

TABLE 6

Anti-Static (% Transmission) Measurements for Example 1

| Top Layer | Silica | | Dirt | | Carbon black | |
| --- | --- | --- | --- | --- | --- | --- |
| | Diamine as lower layer | Piperidinol as lower layer | Diamine as lower layer | Piperidinol as lower layer | Diamine as lower layer | Piperidinol as lower layer |
| TINUVIN 249 | 98.87% | 98.469% | 79.98% | 79.65% | 43.21% | 40.752% |
| Surface Modified Clay | 94.11% | 93.622% | 68.623% | 72.911% | 47.564% | 48.203% |

Example 2

Self-Healing Laminate Compositions on Metal Substrates

Example 2 provides illustrative self-healing laminate structures according to the disclosure. Self-healing polyurethane coatings were applied to a foil substrate, and then a top layer polymeric coating was applied to the underlying self-healing coating. The bottom layer was a piperidinol-based self-healing layer similar to that of Example 1, and the top layer was a thermoset (CC939) layer also that of Example 1. The double-layer coated articles exhibited good anti-rust properties, preventing corrosion of the underlying metal substrate. A control sample with only a top layer on a foil substrate (i.e., no self-healing bottom layer) was also tested.

Control Sample (CC939-UH80): HDIT (1.0 mL, 5.7 mmoles of NCO) was added to a glass vial (20 mL) with a stir bar, followed by the addition of THF (2.0 mL). To the above solution, polyol CC939 (4.0 mL, 5.6 mmol) and tin (II) ethylhexanoate catalyst (5.0 mg) were also added, and the reaction mixture was stirred at room temperature for 5 to 10 min. Next, 0.4-0.5 mL of this solution was cast on aluminum foil (1.5 cm×10 cm), and then maintained at room temperature to remove the visible solvent for 2-3 h, followed by heating at 70° C. for 2 h to cure the top layer and remove the solvent prior to evaluation and testing. This coated aluminum foil was cut with a blade and kept in a closed jar containing 2 mL HCl (1 N). After 40 hours of exposure, the foil was examined, and there was visible rust on the foil surface corresponding to the cut locations, indicating that the damaged/cut coating did not protect against rust.

Two-Layer Laminate Sample (Piperindol-PU and CC939-UH80): As a general procedure for making a polyurethane (PU)-based bottom layer, a PU-prepolymer (ANDUR 75 DPLF; 1.00 g, 1.075 mmol, 1.00 equiv) was dissolved in US3 solvent (4 mL), and the mixture was charged to 20 ml vial. Next, 2,2,6,6-tetramethyl-4-piperidinol (0.177 g, 1.13 mmol, 1.05 equiv) was added to the above solution at room temperature. The temperature of the reaction mixture was increased to 100° C. and stirred for 40 min. After the reaction, 0.5 ml of this solution was cast on aluminum foil (1.5 cm×10 cm), and then maintained at room temperature for several hours. This coated foil with a bottom self-healing layer was then coated with a CC939-UH80 layer as described above by casting about 0.3-0.4 mL of the top layer solution and then maintaining the coated foil at room temperature for several hours to remove visible solvent. This coated aluminum foil was cut with a blade and kept in a closed jar containing 2 mL HCl (1N). After 40 hours of exposure, the foil was examined, and there was no visible rust on the foil surface corresponding to the cut locations, indicating that the damaged/cut coating protected against rust based on the self-healing properties of the bottom layer.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise.

Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A self-healing laminate composition comprising:
   a first layer comprising a self-healing polymer; and
   a second layer adjacent to the first layer and comprising a polymer comprising (A) at least one of the crosslinked polymer and the functional thermoset polymer, and (B) a crosslinked backbone comprising:
   (i) first crosslinked backbone segments having a structure corresponding to at least one of a urethane reaction product and a urea reaction product from at least one second polyisocyanate;
   (ii) second crosslinked backbone segments having a structure corresponding to a urethane reaction product from at least one second polyol;
   (iii) optionally third crosslinked backbone segments having a structure corresponding to at least one of a urethane reaction product and a urea reaction product from at least one second reversible polyfunctional linker comprising at least one of a hindered secondary amino group and an aromatic hydroxy group;
   (iv) first linking groups linking the first crosslinked backbone segments and the second crosslinked backbone segments, the first linking groups corresponding to a urethane reaction product of the second polyisocyanate and the second polyol; and
  (v) optionally second linking groups reversibly linking the first crosslinked backbone segments and the third crosslinked backbone segments, the second linking groups comprising at least one of (A) a reversible urea reaction product between the second polyisocyanate and the hindered secondary amino group of the reversible polyfunctional linker and (B) a reversible urethane reaction product between the second polyisocyanate and the aromatic hydroxy group of the reversible polyfunctional linker;
  wherein the self-healing polymer comprises backbone segments comprising reversible linking groups selected from the group consisting of non-covalent interactions, coatings with trapped unreacted reagents, dynamic covalent bonds, thermoreversible bonds, mechanically reversible bonds, UV-triggerable reversible bonds, and combinations thereof.

2. A self-healing laminate composition comprising:
  a first layer comprising a self-healing polymer; and
  a second layer adjacent to the first layer and comprising a polymer selected from the group consisting of a crosslinked polymer, a thermoplastic polymer, a functional thermoset polymer, and combinations thereof;
  wherein the self-healing polymer comprises:
  (i) first backbone segments having a structure corresponding to at least one of a urethane reaction product and a urea reaction product from at least one polyisocyanate;
  (ii) second backbone segments having a structure corresponding to at least one of a urethane reaction product and a urea reaction product from at least one reversible polyfunctional linker comprising at least one of a hindered secondary amino group and an aromatic hydroxy group; and
  (iii) first linking groups reversibly linking the first backbone segments and the second backbone segments, the first linking groups comprising at least one of (A) a reversible urea reaction product between the polyisocyanate and the hindered secondary amino group of the reversible polyfunctional linker and (B) a reversible urethane reaction product between the polyisocyanate and the aromatic hydroxy group of the reversible polyfunctional linker.

3. The self-healing laminate composition of claim 2, wherein the reversible polyfunctional linker comprises at least two hindered secondary amino groups.

4. The self-healing laminate composition of claim 2, wherein the reversible polyfunctional linker has one hindered secondary amino group.

5. The self-healing laminate composition of claim 2, wherein the reversible polyfunctional linker is selected from the group consisting of N,N'-di(t-butyl) ethylenediamine, N,N'-di(iso-propyl) ethylenediamine, N,N'-di(iso-butyl) ethylenediamine and combinations thereof.

6. The self-healing laminate composition of claim 2, wherein the reversible polyfunctional linker comprises at least two aromatic hydroxy groups.

7. The self-healing laminate composition of claim 2, wherein the reversible polyfunctional linker has one aromatic hydroxy group.

8. The self-healing laminate composition of claim 2, wherein the reversible polyfunctional linker is selected from the group consisting of gallic acid esters, benzene diols, halo-substituted benzene diols, alkyl-substituted benzene diols, bisphenols, ubiquiniol, genistein, gallic acid, pyrogailol, aloe emodin, poly(caffeic acid methyl ester), modified lignins, and combinations thereof.

9. The self-healing laminate composition of claim 2, wherein the polyisocyanate comprises a diisocyanate.

10. The self-healing laminate composition of claim 2, wherein the polyisocyanate comprises a polyurethane prepolymer diisocyanate.

11. The self-healing laminate composition of claim 2, wherein the polyisocyanate comprises a triisocyanate.

12. The self-healing laminate composition of claim 2, wherein:
  the polyisocyanate comprises (i) a diisocyanate and (ii) a tri- or higher isocyanate; and
  the tri- or higher isocyanate is present in an amount from 0.01 to 20 mol. % relative to total polyisocyanates in the self-healing polymer.

13. The self-healing laminate composition of claim 2, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

14. The self-healing laminate composition of claim 1, wherein the self-healing polymer has a glass transition temperature ($T_g$) of 45° C. or less.

15. The self-healing laminate composition of claim 1, wherein the first layer further comprises one or more additives selected from the group consisting of nanoclay, graphene oxide, graphene, graphite, silicon dioxide (silica), aluminum oxide, cellulose nanocrystals, carbon nanotubes, zirconia, titanium dioxide (titania), diatomaceous earth, biocides, pigments, dyes, thermoplastics, low and high molecular weight poly(ethylene oxide), salts, non-ionic ingredients, polyhedral oligomeric silsesquioxane (POSS) and POSS derivatives, functional agents, reaction (polymerization) catalyst, and combinations thereof.

16. The self-healing laminate composition of claim 1, wherein the second layer comprises the crosslinked polymer.

17. The self-healing laminate composition of claim 1, wherein the second layer comprises the thermoplastic polymer.

18. The self-healing laminate composition of claim 1, wherein the second layer comprises the functional thermoset polymer.

19. The self-healing laminate composition of claim 1, wherein the second polyisocyanate comprises a tri- or higher isocyanate.

20. The self-healing laminate composition of claim 1, wherein the second polyol comprises a diol.

21. The self-healing laminate composition of claim 1, wherein the second polyol comprises a triol or higher polyol.

22. The self-healing laminate composition of claim 1, wherein the second polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols, polyester polyols, polyurethane polyols, and combinations thereof.

23. The self-healing laminate composition of claim 1, wherein the third crosslinked backbone segments and the second linking groups are present in the crosslinked polymer.

24. The self-healing laminate composition of claim 23, wherein the second reversible polyfunctional linker comprises the hindered secondary amino group.

25. The self-healing laminate composition of claim 23, wherein the second reversible polyfunctional linker comprises the aromatic hydroxy group.

26. The self-healing laminate composition of claim 23, wherein the second reversible polyfunctional linker is present in an amount from 0.1 to 20 mol. % reversible reactive groups relative to total isocyanate groups in the crosslinked polymer.

27. The self-healing laminate composition of claim 1, wherein the second layer is directly adjacent to the first layer.

28. The self-healing laminate composition of claim 1, wherein the second layer further comprises one or more additives selected from the group consisting of nanoclay, graphene oxide, graphene, graphite, silicon dioxide (silica), aluminum oxide, cellulose nanocrystals, carbon nanotubes, zirconia, titanium dioxide (titania), diatomaceous earth, biocides, pigments, dyes, thermoplastics, low and high molecular weight poly(ethylene oxide), salts, non-ionic ingredients, low-$T_g$ omniphobic polymers, polyhedral oligomeric silsesquioxane (POSS) and POSS derivatives, functional agents, reaction (polymerization) catalyst, and combinations thereof.

29. A self-healing laminate composition comprising:
a first layer comprising a self-healing polymer; and
a second layer adjacent to the first layer and comprising (i) a polymer selected from the group consisting of a crosslinked polymer, a thermoplastic polymer, a functional thermoset polymer, and combinations thereof, and (ii) one or more low-$T_g$ omniphobic polymers as an additive;
wherein the self-healing polymer comprises backbone segments comprising reversible linking groups selected from the group consisting of non-covalent interactions, coatings with trapped unreacted reagents, dynamic covalent bonds, thermoreversible bonds, mechanically reversible bonds, UV-triggerable reversible bonds, and combinations thereof.

30. The self-healing laminate composition of claim 1, wherein:
the first layer has a thickness ranging from 0.01 μm to 500 μm; and
the second layer has a thickness ranging from 0.01 μm to 500 μm.

31. A coated article comprising:
(a) a substrate; and
(b) a self-healing laminate composition according to claim 1, coated on a surface of the substrate, wherein the first layer is closer to the substrate than the second layer.

32. The coated article of claim 31, wherein the substrate is selected from the group consisting of metals, plastics, foams, a different polymer material, glass, wood, fabric, cellulose, lignocellulose, and ceramics.

33. The coated article of claim 31, wherein the substrate comprises a different polymer material from that of the first layer.

34. The coated article of claim 31, wherein:
the first layer has a thickness ranging from 0.01 μm to 500 μm; and
the second layer has a thickness ranging from 0.01 μm to 500 μm.

35. A coated article comprising:
(a) a substrate; and
(b) a self-healing laminate composition according to claim 3, coated on a surface of the substrate, wherein the first layer is closer to the substrate than the second layer.

36. The coated article of claim 31, wherein the substrate comprises a metal selected from aluminum, copper, steel, alloys thereof, and combinations thereof.

* * * * *